United States Patent
Young et al.

(10) Patent No.: US 12,266,772 B2
(45) Date of Patent: Apr. 1, 2025

(54) METHODS AND SYSTEMS FOR SCALABLE DIRECT RECYCLING OF BATTERY WASTE

(71) Applicant: Li Industries, Inc., Pineville, NC (US)

(72) Inventors: David Young, Sudbury, MA (US);
Panni Zheng, Blacksburg, VA (US);
Tairan Yang, Blacksburg, VA (US);
Zheng Li, Blacksburg, VA (US);
Michael W. Ellis, Blacksburg, VA (US)

(73) Assignee: Li Industries, Inc., Pineville, NC (US)

( * ) Notice: Subject to any disclaimer, the term of this patent is extended or adjusted under 35 U.S.C. 154(b) by 0 days.

(21) Appl. No.: 18/314,873

(22) Filed: May 10, 2023

(65) Prior Publication Data

US 2023/0369671 A1    Nov. 16, 2023

Related U.S. Application Data

(60) Provisional application No. 63/340,612, filed on May 11, 2022.

(51) Int. Cl.
*C22B 26/12* (2006.01)
*C22B 1/00* (2006.01)
(Continued)

(52) U.S. Cl.
CPC ............. *H01M 10/54* (2013.01); *C22B 1/005* (2013.01); *C22B 3/22* (2013.01); *C22B 7/001* (2013.01); *C22B 7/006* (2013.01); *C22B 26/12* (2013.01)

(58) Field of Classification Search
CPC .......... C22B 1/005; C22B 3/22; C22B 7/001; C22B 7/006; C22B 26/12
(Continued)

(56) References Cited

U.S. PATENT DOCUMENTS 5,429,889 A    7/1995    Tu Xuan et al.
7,902,299 B2   3/2011    Kerr et al.
(Continued)

FOREIGN PATENT DOCUMENTS

CN    101192693 A    6/2008
CN    102703706 A    10/2012
(Continued)

OTHER PUBLICATIONS

Chen et al., "Recycling of Automobile Products", Shanghai Jiaotong University Press, Jan. 2017, pp. 289-290 and 296-297, with English translation of pertinent portions, 7 pages.
(Continued)

*Primary Examiner* — Melissa S Swain
(74) *Attorney, Agent, or Firm* — COOLEY LLP

(57) ABSTRACT

Embodiments described herein relate to methods of recycling battery waste. In some aspects, a method can include applying a first heat treatment at a temperature of between about 100° C. and about 700° C. to the battery waste, the first heat treatment decomposing at least about 80 wt % of the binder, separating the electrode material from the current collector, and applying a second heat treatment at a temperature between about 400° C. and about 1,200° C. to the electrode material to produce a regenerated electrode material, the second heat treatment decomposing at least 90 wt % of binder remaining in the electrode material to produce a regenerated electrode material. In some embodiments, the method can include applying a surface treatment to the electrode material to remove surface coatings and/or surface impurities from the electrode material. In some embodiments, the surface treatment can include applying a solvent to the electrode material.

27 Claims, 19 Drawing Sheets

(51) Int. Cl.
  *C22B 3/22*   (2006.01)
  *C22B 7/00*   (2006.01)
  *H01M 10/54*  (2006.01)

(58) Field of Classification Search
  USPC .......................................................... 75/345
  See application file for complete search history.

(56) References Cited

U.S. PATENT DOCUMENTS

| | | | |
|---|---|---|---|
| 8,067,107 | B2 | 11/2011 | Sloop et al. |
| 8,497,030 | B2 | 7/2013 | Sloop |
| 8,823,329 | B2 | 9/2014 | Sloop et al. |
| 8,846,225 | B2 | 9/2014 | Sloop |
| 9,287,552 | B2 | 3/2016 | Sloop |
| 9,484,606 | B1 | 11/2016 | Sloop et al. |
| 9,825,341 | B2 | 11/2017 | Sloop |
| 10,014,562 | B2 | 7/2018 | Sloop |
| 10,333,183 | B2 | 6/2019 | Sloop |
| 11,394,062 | B2 | 7/2022 | Sloop |
| 11,631,909 | B2 | 4/2023 | Young et al. |
| 11,894,530 | B2 | 2/2024 | Young et al. |
| 2003/0082453 | A1 | 5/2003 | Numata et al. |
| 2007/0134546 | A1 | 6/2007 | Hashimoto |
| 2010/0146761 | A1 | 6/2010 | Sloop |
| 2010/0203366 | A1 | 8/2010 | Sloop |
| 2013/0206607 | A1 | 8/2013 | Kojima et al. |
| 2013/0256198 | A1* | 10/2013 | Ellis .......................... B07B 1/46  252/182.1 |
| 2013/0266855 | A1 | 10/2013 | Kim et al. |
| 2013/0302226 | A1 | 11/2013 | Wang et al. |
| 2016/0072162 | A1 | 3/2016 | Kepler et al. |
| 2016/0372802 | A1 | 12/2016 | Chiang et al. |
| 2018/0034050 | A1 | 2/2018 | Son et al. |
| 2018/0261894 | A1 | 9/2018 | Wang et al. |
| 2019/0260100 | A1* | 8/2019 | Sloop ....................... H01M 4/48 |
| 2020/0136170 | A1 | 4/2020 | Shin et al. |
| 2021/0143489 | A1 | 5/2021 | Sloop et al. |
| 2022/0029217 | A1 | 1/2022 | Young et al. |
| 2022/0271356 | A1 | 8/2022 | Sloop et al. |
| 2022/0352572 | A1 | 11/2022 | Sloop |
| 2023/0045467 | A1 | 2/2023 | Park et al. |
| 2023/0070883 | A1 | 3/2023 | Sloop et al. |
| 2023/0198041 | A1 | 6/2023 | Sloop et al. |
| 2023/0246260 | A1 | 8/2023 | Young et al. |
| 2023/0395889 | A1 | 12/2023 | Yang et al. |
| 2023/0411725 | A1 | 12/2023 | Yang et al. |
| 2024/0186604 | A1* | 6/2024 | Miyanaga ................ C22B 7/007 |
| 2024/0186607 | A1 | 6/2024 | Young et al. |

FOREIGN PATENT DOCUMENTS

| | | | | |
|---|---|---|---|---|
| CN | 103915661 | A | | 7/2014 |
| CN | 105375077 | A | | 3/2016 |
| CN | 106654434 | A | * | 5/2017 ............ H01M 10/54 |
| CN | 108735998 | A | | 11/2018 |
| CN | 108996484 | A | | 12/2018 |
| CN | 109193063 | A | | 1/2019 |
| CN | 110828887 | A | | 2/2020 |
| CN | 113571699 | A | | 10/2021 |
| EP | 1041659 | A1 | | 10/2000 |
| EP | 4095982 | A1 | | 11/2022 |
| JP | 2009032678 | A | | 2/2009 |
| JP | 2013001950 | A | | 1/2013 |
| JP | 2013111543 | A | | 6/2013 |
| JP | 2014203567 | A | | 10/2014 |
| KR | 20000029651 | A | | 5/2000 |
| KR | 20210145456 | A | | 12/2021 |
| WO | WO-0019557 | A1 | | 4/2000 |
| WO | WO-2007088617 | A1 | * | 8/2007 ............ C25C 3/02 |
| WO | WO-2009105713 | A1 | | 8/2009 |
| WO | WO-2010014637 | A1 | | 2/2010 |
| WO | WO-2010077982 | A2 | | 7/2010 |
| WO | WO-2011109831 | A2 | | 9/2011 |
| WO | WO-2012042714 | A1 | | 4/2012 |
| WO | WO-2014017086 | A1 | | 1/2014 |
| WO | WO-2016022858 | A1 | | 2/2016 |
| WO | WO-2017142644 | A2 | | 8/2017 |
| WO | WO-2018014136 | A1 | * | 1/2018 ............ H01M 10/54 |
| WO | WO-2020112813 | A1 | | 6/2020 |
| WO | WO-2020236513 | A1 | | 11/2020 |
| WO | WO-2021096990 | A1 | | 5/2021 |
| WO | WO-2021241819 | A1 | | 12/2021 |
| WO | WO-2022209421 | A1 | | 10/2022 |
| WO | WO-2023019224 | A1 | | 2/2023 |
| WO | WO-2023060992 | A1 | | 4/2023 |
| WO | WO-2023220102 | A1 | | 11/2023 |
| WO | WO-2024124031 | A2 | | 6/2024 |

OTHER PUBLICATIONS

Chinese Office Action and Search Report for Chinese Application No. 201980089652.8, dated Mar. 23, 2022, with English translation.
Extended European Search Report for European Application No. 19890650.5, dated Jul. 29, 2022, 8 pages.
International Preliminary Report on Patentability dated May 25, 2021, Written Opinion of the International Searching Authority, and International Search Report dated Feb. 6, 2020, for International Application No. PCT/US2019/063305, 9 pages.
Notice of Allowance for U.S. Appl. No. 17/298,276 dated Feb. 9, 2023, 8 pages.
Office Action for Chinese Application No. 201980089652.8 dated Feb. 8, 2023, 18 pages, with English translation.
Invitation to pay additional fees for International Application No. PCT/US2023/021622, dated Jul. 19, 2023, 3 pages.
International Search Report and Written Opinion for International Application No. PCT/US2023/021622, mailed on Sep. 27, 2023, 11 pages.
Non-Final Office Action for U.S. Appl. No. 18/131,637 dated Aug. 21, 2023, 4 pages.
Gaines L, et al., "Lithium-ion battery recycling processes: Research towards a sustainable course" Sustainable Materials and Technologies, vol. 17, 2018, pp. 1-15.
Chu-Ying et al. "First principles study on $Na_xLi_{1-x}FePO_4$ as cathode material for rechargeable lithium batteries." Chinese Physics Letters 23.1 (2006): 61-64.
*Freedom to Operate, Inc. v. Compass Pathways Limited.* Case PGR2022-00012, U.S. Pat. No. 10,947,257. Exhibit 1048: Toby B.H. and Von Dreele, B. GSAS-II: The genesis of a modern open-source all purpose crystallography software package. J Appl Cryst, (2013) 46, 544-549. (PTAB Dec. 15, 2021).
International Search Report and Written Opinion for PCT Application No. PCT/US2023/082935 dated Jun. 4, 2024, 19 pages.
Invitation to pay additional fees for International Application No. PCT/US2023/082935 dated Apr. 12, 2024, 9 pages.
Meethong et al. "Aliovalent substitutions in olivine lithium iron phosphate and impact on structure and properties." Advanced Functional Materials 19.7 (2009): 1060-1070.
Molenda et al. "Structural, transport and electrochemical properties of $LiFePO_4$ substituted in lithium and iron sublattices (Al, Zr, W, Mn, Co and Ni)." Materials 6.5 (2013): 1656-1687.
Xu et al. "Effects of doping on the electronic properties of $LiFePO_4$: A first-principles investigation." Physica B: Condensed Matter 405.3 (2010): 803-807.
International Search Report and Written Opinion for International Application No. PCT/US2024/034329 mailed Oct. 2, 2024, 16 pages.
Qin et al., "Recovery and Reuse of Spent $LiFePO_4$ Batteries," Journal of New Materials for Electrochemical Systems, vol. 22, No. 3, Aug. 31, 2019, pp. 119-124.
Office Action for Korean Application No. 10-2021-7019424 mailed Oct. 15, 2024, 16 pages, with English translation.
Khosravi et al. "Generalized preparation method and characterization of aluminum isopropoxide, aluminum phenoxide, and aluminum n-hexyloxide," Polyhedron, vol. 62, 2013, pp. 18-25.
Kulka et al., "Possibility of modification of phosphoolivine by substitution in Li sublattice," Solid State Ionics, vol. 225, 2012, pp. 575-579.

(56) References Cited

OTHER PUBLICATIONS

Non-Final Office Action for U.S. Appl. No. 18/745,378 mailed Nov. 29, 2024, 22 pages.

* cited by examiner

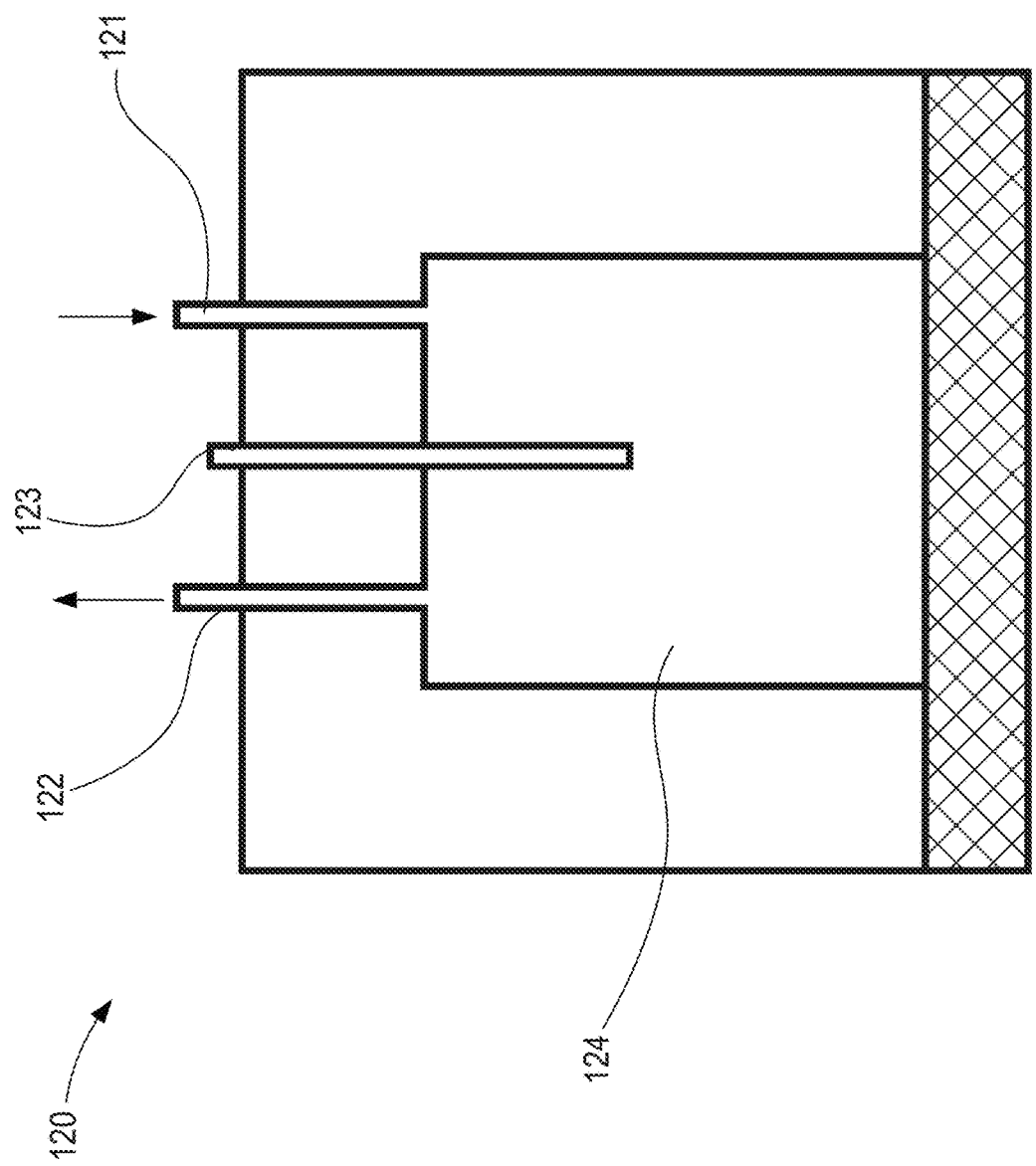

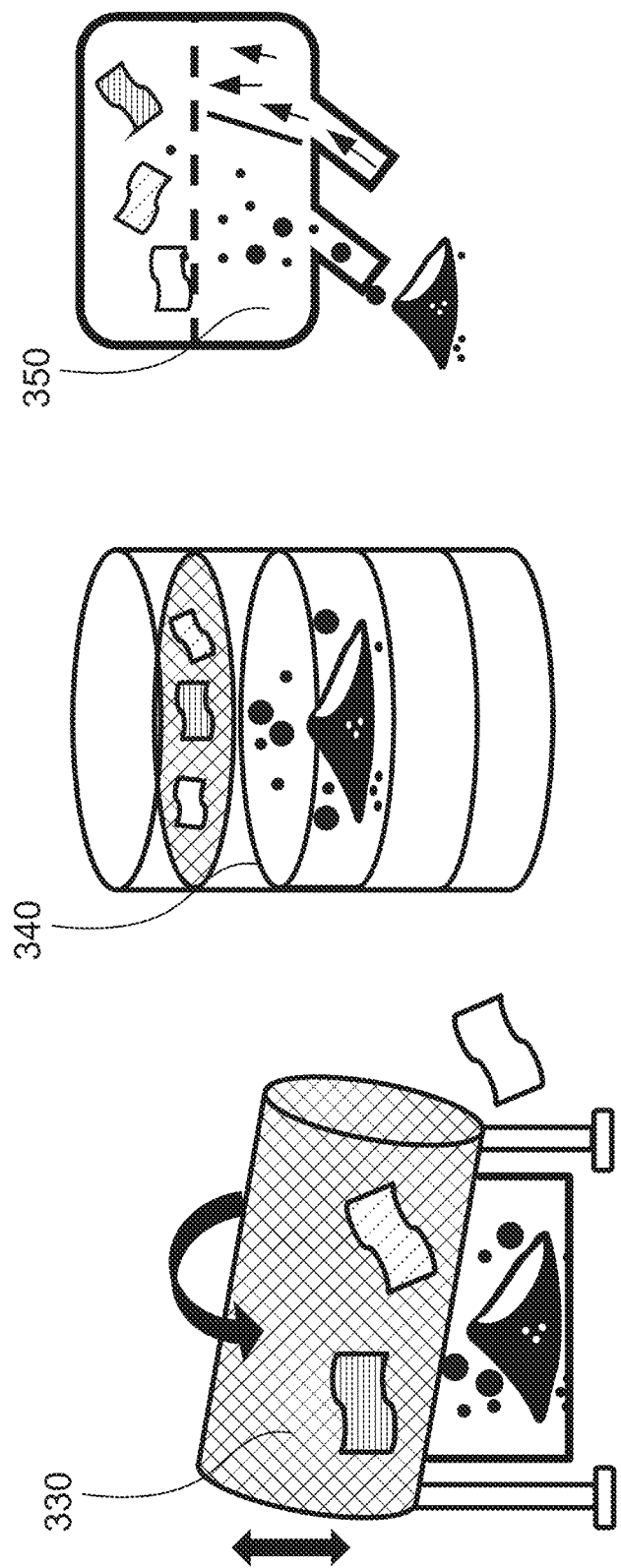

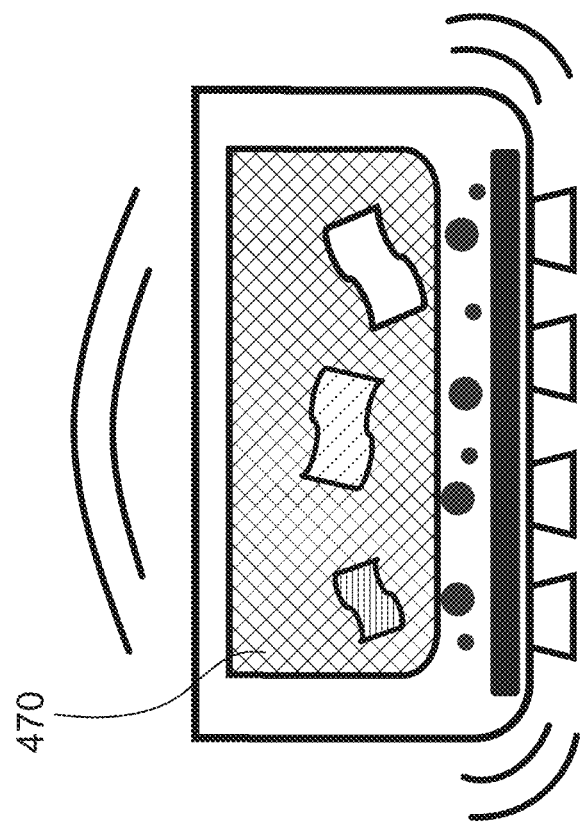
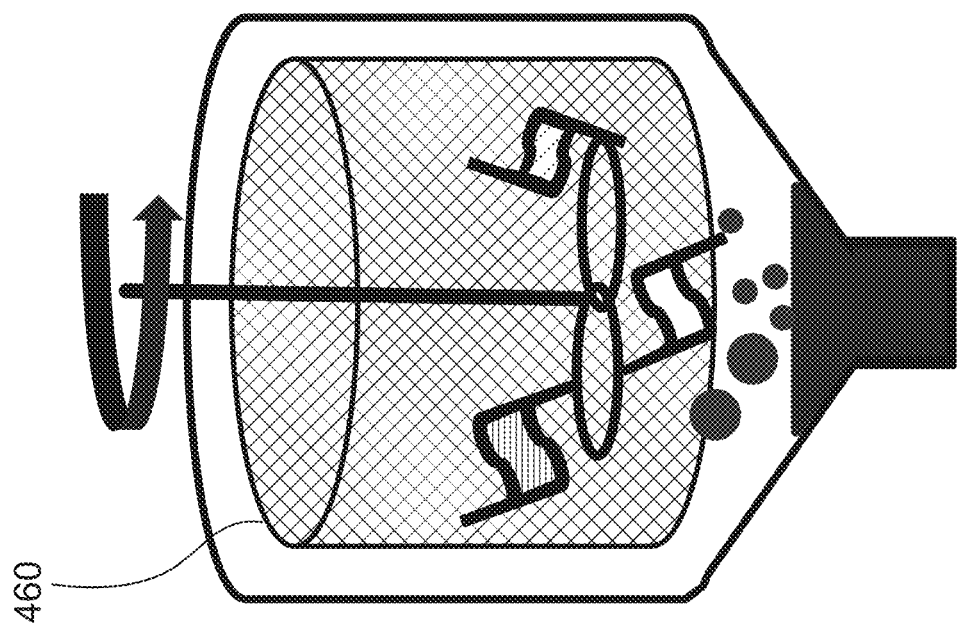
FIG. 5B

METHODS AND SYSTEMS FOR SCALABLE DIRECT RECYCLING OF BATTERY WASTE

CROSS REFERENCE TO RELATED APPLICATIONS

This application claims the benefit of U.S. Provisional Application No. 63/340,612, titled "Methods and Systems for Scalable Direct Recycling of Battery Waste," and filed May 11, 2022, the disclosure of which is incorporated herein by reference in its entirety.

TECHNICAL FIELD

The present disclosure relates generally to systems, apparatus, and methods for recycling energy storage devices, and more particularly to recycling of lithium-ion batteries and their components, including waste generated during manufacturing, usage, and disposal

BACKGROUND

Lithium-ion batteries have high power and energy density, long cycle life, high potential, and low self-discharge rate. As a result, they are usually regarded as the most promising approach for near-term energy storage and widely used in consumer electronics, electric vehicles, and grid energy storage. However, lithium-ion batteries also have several drawbacks, including limitations of battery material supply, environmental hazards during production or end of life, and the high cost of manufacturing.

SUMMARY

Embodiments described herein relate to methods of recycling battery waste. In some aspects, a method can include applying a first heat treatment at a temperature of between about 100° C. and about 700° C. to the battery waste, the first heat treatment decomposing at least about 80 wt % of the binder, separating the electrode material from the current collector, and applying a second heat treatment at a temperature between about 400° C. and about 1,200° C. to the electrode material to produce a regenerated electrode material, the second heat treatment decomposing at least 90 wt % of binder remaining in the electrode material to produce a regenerated electrode material. In some embodiments, the method can include applying a surface treatment to the electrode material to remove surface coatings and/or surface impurities from the electrode material. In some embodiments, the surface treatment can include applying a solvent to the electrode material. In some embodiments, the solvent can include citric acid, acetic acid, oxalic acid, ammonia, ammonium hydroxide, ammonium chloride, and/or chemical derivatives thereof.

In some embodiments, a system for direct recycling of battery waste is described. The system can include one or more of the following operations in a combination (including one or more of the same operations in combination): a heat treatment subsystem, a separation subsystem, a surface treatment subsystem, a relithiation subsystem, a washing subsystem, a chemical purification subsystem, and a flotation subsystem. In some embodiments, the system can yield commercial-grade electrode materials, such as cathode and anode materials, for reuse.

BRIEF DESCRIPTION OF THE DRAWINGS

FIGS. 2A-2B are illustrations of a muffle furnace for heat treatment of battery waste, according to an embodiment.

FIG. 4B shows illustrations of processing equipment for processing battery waste, according to various embodiments.

FIG. 5B shows illustrations of processing equipment for processing battery waste, according to various embodiments.

DETAILED DESCRIPTION

Figure 1:
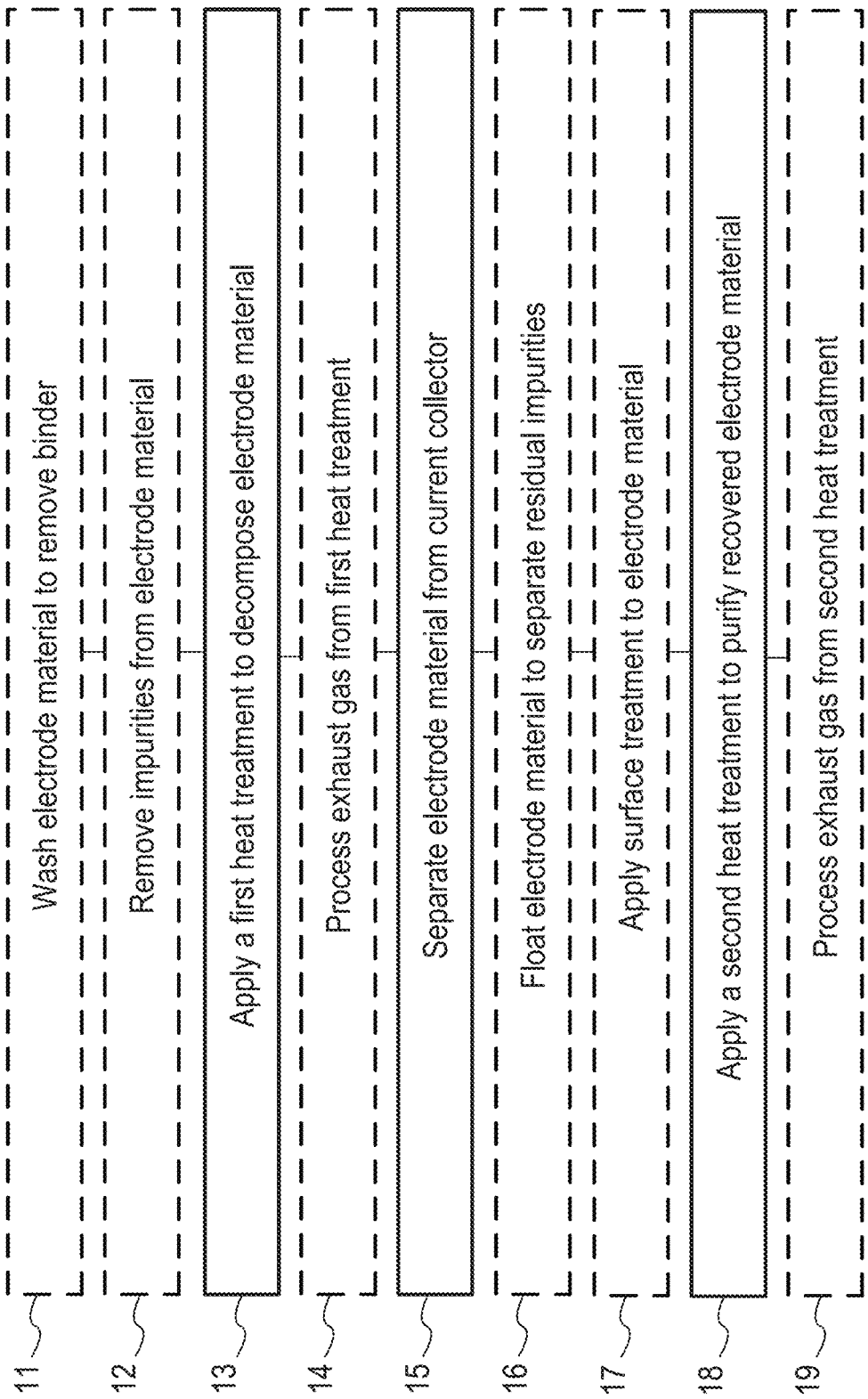
FIG. 1 is a flow diagram of a method of recycling battery waste, according to an embodiment.

Lithium-ion batteries generate significant waste during their manufacturing, usage, and disposal. To address the environmental sustainability concerns associated with continued lithium-ion battery consumption, effective recycling methods can be deployed to recover materials for reuse, including reincorporation of recovered materials in manufacturing of new lithium-ion batteries. Recycled battery materials can have the advantage of reducing greenhouse gas emissions, energy consumption, and virgin materials usage in the battery manufacturing process.

Recycling of batteries can be implemented via at least three approaches: pyrometallurgical recycling, hydrometallurgical recycling, and direct recycling. In pyrometallurgical battery recycling, batteries and battery waste are directly smelted to recover valuable metals, such as Co, Ni, and Cu, which are typically in the form of an alloy from the bottom of smelters. A leaching process is usually performed to separate the recovered metals.

Smelting can be employed to economically recover some elements (e.g., Co, Mn, Ni) from several types of cathode materials, including $LiCoO_2$ (also referred to herein as lithium cobalt oxide or LCO), $LiMn_2O_4$ (also referred to herein as lithium manganese oxide or LMO), and $LiNi_xMn_yCo_zO_2$ where $x+y+z=1$ (also referred to herein as lithium nickel cobalt manganese oxide or NCM). In some embodiments, any one of x, y, or z can be zero. However, it is generally not economically advantageous to recycle $LiFe_tM_{1-t}PO_4$; where $0<1<t$; M=Mn, Ni, Co, V or metal elements, or a combination of several metal elements (LFMP) (also referred to herein as lithium iron phosphate or LFP) cathodes via smelting, because metals that are recovered from LFMP batteries are less valuable. In addition, lithium and aluminum often end up in a slag from melting. Extensive and costly processing is often conducted to separate the metals before they can be used to construct new batteries. Furthermore, the smelting process itself often generates extensive waste gases, thereby increasing the overall cost due to subsequent waste treatment.

Hydrometallurgical recycling processes separate and/or isolate battery constituents before further processing. This approach is also applicable to recycle nickel metal hydride (Ni-MH) batteries. For lithium-ion batteries, lithium is ultimately recovered as $Li_2CO_3$, and other major materials such as Co, Ni, and Al can also be recovered. For Ni-MH batteries, rare earth metals and nickel can be recovered. Although hydrometallurgical recycling does not involve high temperature and high volume, such approach changes the morphology of battery cathode materials, thereby rendering the cathode materials unsuitable for re-use without further processing. Hydrometallurgical recycling is described in greater detail in U.S. Pat. No. 8,846,225 ("the '225 patent"), entitled "Reintroduction of lithium into recycled battery materials," which is hereby incorporated by reference in its entirety.

Direct recycling of batteries, compared to the two approaches described above, can recover valuable cathode materials, as well as anode materials, current collectors, binder, and electrolyte. The direct recycling approaches include nondestructive recycling approaches and can preserve the structure, morphology, and electrochemical properties of valuable material. Direct recycling can be adapted to recycle entire batteries, individual battery components, a combination of battery components, battery manufacturing waste, or battery disposal waste. Effective direct recycling processes can have the flexibility to recycle different battery materials, while also maintaining the ability to produce commercially usable recovered materials.

Systems and methods described herein relate to direct recycling of batteries and battery waste in an efficient and scalable manner. In this technique, batteries and battery waste are processed through several steps to isolate, purify, and/or regenerate one or more recoverable battery components. These processes have been designed to be scalable to recycle batteries and battery waste in large quantities.

Battery waste can include waste or scrap from a battery manufacturing process, which can include any single battery component, any combination of battery components, entire batteries at the end of their usable lifetime, defective batteries, damaged batteries, or any other form or combinations thereof. In some embodiments, the battery waste can include one or more cathode sheets, comprising a cathode material and a cathode current collector (often aluminum or similar material). In some embodiments, the cathode sheets additionally can include binder, a conductive additive such as carbon, electrolyte, lithium salts, and/or other functional additives. In some embodiments, the battery waste can include one or more anode sheets, comprising an anode material and an anode current collector (often copper or similar material). In some embodiments, the anode sheets additionally can include binder, a conductive additive such as carbon, electrolyte, lithium salts, and/or other functional additives. In some embodiments, the battery waste includes separators, packaging material, electrical leads, and/or other battery components. In some embodiments, the battery waste can be cut, shredded, ground, mixed, or otherwise combined. In some embodiments, the battery waste is a black mass, which can include shredded, ground, mixed, or otherwise combined battery waste with one or more components partly or entirely removed (e.g., battery casing removed). Herein, anodes and/or cathodes can be referenced to as electrodes. An anode can include an anode material and an anode current collector. A cathode can include a cathode material and a cathode current collector. Anode materials and cathode materials can more generically be referred to as electrode materials.

In some embodiments, the electrode material can include a common lithium-ion battery composition such as LCO, LMO, NCM, lithium nickel cobalt aluminum oxide ($LiNi_xCo_yAl_zO_2$ with $x+y+z=1$), $LiNi_aMn_bCo_cA_dO_2$, where $a+b+c+d=1$, A=Al, Zr, or Mg, LFP, LFMP, graphite, lithium titanate ($Li_4Ti_5O_{12}$ or LTO), or other common composition or derivatives, or combinations thereof.

Recycling methods described herein can include one or more of the following operations in a combination (including one or more of the same operations in combination): a heat treatment operation, a separation operation, a surface treatment operation, a relithiation operation, a washing operation, a chemical purification process, and a flotation process. In some embodiments, the recycling method yields commercial-grade cathode and anode materials. In some embodiments, the recycling method yields metal scrap, such as copper, aluminum, steel, or a mixture thereof. In some embodiments, organic materials, such as carbon, electrolyte, separator, can be isolated and recovered.

FIG. 1 is a flow diagram of a method 10 of recycling battery waste, according to an embodiment. Battery waste can include an electrode material coupled to a current collector. The electrode material can include an active material and a binder. In some embodiments, the electrode material can include a conductive material. In some embodiments, anodes and cathodes can be processed separately via the method 10. In some embodiments, anodes and cathodes can be processed together via the method 10. In some embodiments, the input battery waste can include cathode and/or anode sheets (or mixture thereof), comprising a cathode or anode (that can, in some cases, be mixed with a binder and/or additives such as conductive carbon) and a current collector. In some embodiments, the current collector can be composed of aluminum and/or copper. In some embodiments, the battery waste can include other components such as separator, electrolyte, lithium salts, and/or packaging. In some embodiments, the method 10 can be suitable for processing battery waste containing cathodes, anodes, or a mixture thereof, or batteries with or without electrolyte that are fed as the input for recycling. In some embodiments, the battery waste is one or more completely or partially assembled batteries (with or without electrolyte). In some embodiments, the battery waste can first be disassembled, processed into a plurality of sections, shredded, cut, or other process that can expose the components of battery waste for further processing. In some embodiments, this initial processing of battery waste can include a discharging step to remove some or all of the residual stored energy in the battery waste. In some embodiments, this discharging step can be performed using electronic discharge (e.g., resistive discharging, electronically conductive slurry or liquid discharging) and/or ionic discharging (e.g., discharging in an ionically conductive solution).

As shown, the method 10 optionally includes washing electrode material to remove binder at step 11 and removing impurities from the electrode material at step 12. The method 10 includes applying a heat treatment to decompose the electrode material at step 13. The method 10 optionally includes processing exhaust gas from the first heat treatment at step 14. The method 10 further includes separating the electrode material from the current collector at step 15. The method 10 optionally includes floating the electrode material to separate residual impurities from the electrode material at step 16 and applying a surface treatment to the electrode material at step 17. The method 10 further includes applying a second heat treatment to purify the recovered electrode material at step 18. The method 10 optionally includes processing exhaust gas from the second heat treatment.

Step 11 is optional and includes washing the electrode material to remove at least a portion of the binder. The washing dissolves and removes at least a portion of the binder using a solvent. Most or all of the binder, current collector, and other large-particle battery components are separated from the electrode powder (and any residual material) during this wash process. In some embodiments, the electrode material include an aqueous-based binder (i.e., dissolvable in aqueous solution), and the wash operation can utilize an aqueous solvent (e.g., water or an alkaline solution, such as those including LiOH, NaOH, KOH, with a pH of no more than about 14, no more than about 13, no more than about 12, no more than about 11, no more than about 10, no more than about 9, no more than about 8, or no more than about 7.5). In some embodiments, the electrode material can include a non-aqueous-based binder (i.e., not dissolvable in aqueous solution), and the wash operation can utilize an organic or nonpolar solvent. In some embodiments, the nonpolar solvent can include N-Methyl-2-pyrrolidone (NMP), dimethylformamide (DMF), dimethylacetamide (DMAc or DMA), cyrene, or their derivatives, or any combination thereof. In some embodiments, the electrode material can at least partially separate from the current collector during the washing. In other words, step 11 can occur at least partially concurrently with step 15. In some embodiments after the wash operation, other battery components, such as residual carbon and other organics, residual binder, smaller particles of current collector, or any other components or combinations thereof can be present with the electrode material.

In some embodiments, the washing can be performed in a controlled gas environment. In some embodiments, the gas environment can be inert. In some embodiments, the gas environment can include $N_2$, Ar, or other similar gas. In some embodiments, the gas environment can include $CO_2$. In some embodiments, the gas environment can be reducing. In some embodiments, the gas environment can include $H_2$, a mixture of Ar and $H_2$, a mixture of $N_2$ and $H_2$, or a mixture of $CO_2$ and CO. In some embodiments, the gas environment can include an oxidizing environment. An oxidizing environment can assist in the removal of organic compounds. In some embodiments, air or other aforementioned gas flows along or through the battery waste during the washing. In some embodiments, no gas flows along or through the battery waste during the washing.

In some embodiments, the gas environment can include about 0 vol %, about 1 vol %, about 2 vol %, about 3 vol %, about 4 vol %, about 5 vol %, about 6 vol %, about 7 vol %, about 8 vol %, about 9 vol %, about 10 vol %, about 12 vol %, about 13 vol %, about 14 vol %, about 15 vol %, about 16 vol %, about 17 vol %, about 18 vol %, about 19 vol %, about 20 vol %, about 21 vol %, about 22 vol %, about 23 vol %, about 24 vol %, or about 25 vol % $O_2$, inclusive of all values and ranges therebetween. In some embodiments, the gas environment can include an elevated amount of oxygen. In some embodiments, the gas environment can include pure oxygen or oxygen of a high purity. In some embodiments, the gas environment can include about 30 vol %, about 35 vol %, about 40 vol %, about 45 vol %, about 50 vol %, about 55 vol %, about 60 vol %, about 65 vol %, about 70 vol %, about 75 vol %, about 80 vol %, about 85 vol %, about 90 vol %, about 95 vol %, or about 100 vol % $O_2$, inclusive of all values and ranges therebetween.

Step 12 is optional and includes removing impurities from the electrode material. In some embodiments, step 12 can include removal of some, most, or all of the residual metal debris, such as debris derived from the current collectors (e.g., Cu and/or Al). In some embodiments step 12 can include modifying the electrode powder surface to enable more facile or effective relithiation and/or regeneration. In some embodiments, step 12 can be performed prior to a heat treatment step (e.g., step 13) to enable removal of impurities, such as Cu, that would be unable to be removed after a heat treatment step. In such cases, the heat treatment operation can oxidize the components and render them unable to be removed easily by a purification operation. In some embodiments, step 12 can include the use of a weak acid or base as a solvent. In some embodiments, step 12 can include the use of a citric acid, acetic acid, oxalic acid, or similar acid. In some embodiments, the purification operation uses ammonia or an ammonia-based solution or similar solution. In some embodiments, step 12 can include removing residual copper and/or residual aluminum from the electrode material. Step 12 can include dissolving and removing impurities from the electrode material collected from the wash operation at step 11. In some embodiments, step 12 can include utilizing a solvent to dissolve and remove impurities. In some embodiments, step 12 can utilize an alkaline solution (e.g., a solution containing LiOH, NaOH, and/or KOH).

In some embodiments, a mechanical agitation, mixing technique, and/or heating can be included to remove impurities from the electrode material. In some embodiments, copper and/or aluminum debris from the current collectors is removed during step 12. In some embodiments, an ammonia-based solution can be used to remove impurities from the electrode material, such as copper. Ammonia or ammonia-based compounds (such as ammonium chloride or ammonium hydroxide) can react and dissolve copper, thus removing it as an impurity from the electrode material. In some embodiments, the purification operation can utilize a weak acidic solution, such as acetic, citric, oxalic acid (or other similar acid) to remove impurities, particularly metal or metal oxide impurities. In some embodiments, the purification operation can utilize other acidic solutions, such as nitric, sulfuric, and/or hydrochloric acid (or other similar acid) to remove impurities, particularly metal or metal oxide impurities. In many cases, the purification operation can be carefully designed to not affect the integrity of the electrode materials.

In some embodiments, the solution used to remove impurities from the electrode material can have a pH of at least about 0, at least about 0.5, at least about 1, at least about 1.5, at least about 2, at least about 2.5, at least about 3, or at least about 3.5. In some embodiments, the solution used to remove impurities from the electrode material can have a pH of no more than about 4, no more than about 3.5, no more than about 3, no more than about 2.5, no more than about 2, no more than about 1.5, no more than about 1, or no more than about 0.5. Combinations of the above-referenced pH values are also possible (e.g., at least about 0 and no more than about 4 or at least about 1 and no more than about 3. In some embodiments, the solution used to remove impurities from the electrode material can have a pH of about 0, about 0.5, about 1, about 1.5, about 2, about 2.5, about 3, about 3.5, or about 4.

In some embodiments, the solution used to remove impurities from the electrode material can have a pH of at least about 13, at least about 13.1, at least about 13.2, at least about 13.3, at least about 13.4, at least about 13.5, at least about 13.6, at least about 13.7, at least about 13.8, at least about 13.9, at least about 14, at least about 14.1, at least about 14.2, at least about 14.3, at least about 14.4, at least about 14.5, at least about 14.6, at least about 14.7, at least about 14.8, or at least about 14.9. In some embodiments, the solution used to remove impurities from the electrode material can have a pH of no more than about 15, no more than about 14.9, no more than about 14.8, no more than about 14.7, no more than about 14.6, no more than about 14.5, no more than about 14.4, no more than about 14.3, no more than about 14.2, no more than about 14.1, no more than about 14, no more than about 13.9, no more than about 13.8, no more than about 13.7, no more than about 13.6, no more than about 13.5, no more than about 13.4, no more than about 13.3, no more than about 13.2, or no more than about 13.1. Combinations of the above-referenced pH values are also possible (e.g., at least about 13 and no more than about 15 or at least about 13.5 and no more than about 14.5), inclusive of all values and ranges therebetween. In some embodiments, the solution used to remove impurities from the electrode material can have a pH of about 13, about 13.1, about 13.2, about 13.3, about 13.4, about 13.5, about 13.6, about 13.7, about 13.8, about 13.9, about 14, about 14.1, about 14.2, about 14.3, about 14.4, about 14.5, about 14.6, about 14.7, about 14.8, about 14.9, or about 15.

In some embodiments, the purification operation can have a duration of at least about 30 seconds, at least about 1 minute, at least about 2 minutes, at least about 3 minutes, at least about 4 minutes, at least about 5 minutes, at least about 6 minutes, at least about 7 minutes, at least about 8 minutes, at least about 9 minutes, at least about 10 minutes, at least about 15 minutes, at least about 20 minutes, at least about 25 minutes, at least about 30 minutes, at least about 35 minutes, at least about 40 minutes, at least about 45 minutes, at least about 50 minutes, at least about 55 minutes, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 12 hours, at least about 14 hours, at least about 16 hours, at least about 18 hours, at least about 20 hours, at least about 25 hours, or at least about 30 hours. In some embodiments, the purification operation can have a duration of no more than about 31 hours, no more than about 26 hours, no more than about 21 hours, no more than about 19 hours, no more than about 17 hours, no more than about 15 hours, no more than about 13 hours, no more than about 11 hours, no more than about 10 hours, no more than about 9 hours, no more than about 8 hours, no more than about 7 hours, no more than about 6 hours, no more than about 5 hours, no more than about 4 hours, no more than about 3 hours, no more than about 2 hours, no more than about 1 hour, no more than about 55 minutes, no more than about 50 minutes, no more than about 45 minutes, no more than about 40 minutes, no more than about 35 minutes, no more than about 30 minutes, no more than about 25 minutes, no more than about 20 minutes, no more than about 15 minutes, no more than about 10 minutes, no more than about 9 minutes, no more than about 8 minutes, no more than about 7 minutes, no more than about 6 minutes, no more than about 5 minutes, no more than about 4 minutes, no more than about 3 minutes, no more than about 2 minutes, or no more than about 1 minute. Combinations of the above-referenced durations are also possible (e.g., at least about 30 seconds and no more than about 31 hours or at least about 2 minutes and no more than about 4 minutes), inclusive of all values and ranges therebetween. In some embodiments, the purification operation can have a duration of about 30 seconds, about 1 minute, about 2 minutes, about 3 minutes, about 4 minutes, about 5 minutes, about 6 minutes, about 7 minutes, about 8 minutes, about 9 minutes, about 10 minutes, about 15 minutes, about 20 minutes, about 25 minutes, about 30 minutes, about 35 minutes, about 40 minutes, about 45 minutes, about 50 minutes, about 55 minutes, about 1 hour, about 2 hours, about 3 hours, about 4 hours, about 5 hours, about 6 hours, about 7 hours, about 8 hours, about 9 hours, about 10 hours, about 12 hours, about 14 hours, about 16 hours, about 18 hours, about 20 hours, about 25 hours, or about 30 hours.

In some embodiments, the purification operation can be performed at a temperature of at least about 20° C., at least about 30° C., at least about 40° C., at least about 50° C., at least about 60° C., at least about 70° C., at least about 80° C., or at least about 90° C. In some embodiments, the purification operation can be performed at a temperature of no more than about 100° C., no more than about 90° C., no more than about 80° C., no more than about 70° C., no more than about 60° C., no more than about 50° C., no more than about 40° C., or no more than about 30° C. Combinations of the above-referenced temperatures are also possible (e.g., at least about 20° C. and no more than about 100° C. or at least about 40° C. and no more than about 60° C.), inclusive of all values and ranges therebetween. In some embodiments, the purification operation can be performed at a temperature of about 20° C., about 30° C., about 40° C., about 50° C., about 60° C., about 70° C., about 80° C., about 90° C., or about 100° C.

The purification operation can modify and optimize the surface morphology of the electrode material by removing unfavorable surface coatings or impurities (such as inactive secondary phases) from the electrode material or altering the surface structure or chemistry of the electrode material. These impurities can form under a variety of circumstances, including, but not limited to, battery manufacturing, exposure to different atmospheres or humidity, or during a preceding operation during the recycling process. The modification and optimization of the surface morphology of the electrode materials during this purification operation can improve the performance of the recovered or regenerated electrode materials. The modification and optimization of the surface morphology of the electrode materials during this purification operation can also assist in more facile relithiation during subsequent heat treatment operations.

The modified surface can allow the more facile introduce of lithium into the structure of the electrode from a lithium source.

In some embodiments, the purification can be performed in a controlled gas environment. In some embodiments, the gas environment can be inert. In some embodiments, the gas environment can include $N_2$, Ar, or other similar gas. In some embodiments, the gas environment can include $CO_2$. In some embodiments, the gas environment can be reducing. In some embodiments, the gas environment can include $H_2$, a mixture of Ar and $H_2$, a mixture of $N_2$ and $H_2$, or a mixture of $CO_2$ and CO. In some embodiments, the gas environment can include an oxidizing environment. An oxidizing environment can assist in the removal of organic compounds. In some embodiments, air or other aforementioned gas flows along or through the battery waste during the purification. In some embodiments, no gas flows along or through the battery waste during the purification. In some embodiments, the surface treatment can be performed under increased gas pressure. In some embodiments, the surface treatment can be performed under decreased gas pressure.

In some embodiments, the gas environment can include about 0 vol %, about 1 vol %, about 2 vol %, about 3 vol %, about 4 vol %, about 5 vol %, about 6 vol %, about 7 vol %, about 8 vol %, about 9 vol %, about 10 vol %, about 12 vol %, about 13 vol %, about 14 vol %, about 15 vol %, about 16 vol %, about 17 vol %, about 18 vol %, about 19 vol %, about 20 vol %, about 21 vol %, about 22 vol %, about 23 vol %, about 24 vol %, or about 25 vol % $O_2$, inclusive of all values and ranges therebetween. In some embodiments, the gas environment can include an elevated amount of oxygen. In some embodiments, the gas environment can include pure oxygen or oxygen of a high purity. In some embodiments, the gas environment can include about 30 vol %, about 35 vol %, about 40 vol %, about 45 vol %, about 50 vol %, about 55 vol %, about 60 vol %, about 65 vol %, about 70 vol %, about 75 vol %, about 80 vol %, about 85 vol %, about 90 vol %, about 95 vol %, or about 100 vol % $O_2$, inclusive of all values and ranges therebetween.

Step 13 includes applying a first heat treatment to decompose the electrode material. The first heat treatment can remove or decompose some or all of several components of the battery waste, including, but not limited to, binder, conductive additives, such as carbon, electrolyte, and/or lithium salts. The first heat treatment operation is operated at a temperature that largely or entirely preserves the structure of the electrode material or current collector. Some current collector materials can become oxidized during the first heat treatment. For example, copper can form copper oxides during the first heat treatment. In some embodiments, the first heat treatment can be performed in a heating chamber (e.g., an oven or a furnace). In some embodiments, the first heat treatment operation can also convert hydrophilic organic materials (such as carbon-based anode material or conductive organic additives) to hydrophobic organic materials, which can be advantageous for a subsequent flotation operation (i.e., step 16). In some embodiments, the heat treatment at step 13 can occur before the removal of impurities from the electrode material at step 12. In some embodiments, the heat treatment at step 13 can occur after the removal of impurities from the electrode material at step 12.

In some embodiments, the first heat treatment can be performed at a temperature of at least about 100° C., at least about 150° C., at least about 200° C., at least about 250° C., at least about 300° C., at least about 350° C., at least about 400° C., at least about 450° C., at least about 500° C., at least about 550° C., at least about 600° C., or at least about 650° C. In some embodiments, the first heat treatment can be performed at a temperature of no more than about 700° C., no more than about 650° C., no more than about 600° C., no more than about 550° C., no more than about 500° C., no more than about 450° C., no more than about 400° C., no more than about 350° C., no more than about 300° C., or no more than about 250° C. Combinations of the above-referenced temperatures are also possible (e.g., at least about 200° C. and no more than about 700° C. or at least about 400° C. and no more than about 600° C.), inclusive of all values and ranges therebetween. In some embodiments, the first heat treatment can be performed at a temperature of about 100° C., about 150° C., about 200° C., about 250° C., about 300° C., about 350° C., about 400° C., about 450° C., about 500° C., about 550° C., about 600° C., about 650° C., or about 700° C.

In some embodiments, the first heat treatment is performed on battery waste containing polyvinylidene fluoride (PVDF). The isothermal degradation for the PVDF binder begins at about 300-400° C. The heat treatment can be performed above 400° C. to ensure thermal degradation of the PVDF. The PVDF binder is thermally decomposed at such temperatures and vaporized along with any electrolyte solvent residue (e.g., EC, DMC, EMC, DEC, and PC) present. Such a heat treatment condition can burn off the PVDF binder efficiently, while largely or entirely preserving the structural and compositional integrity of other battery components, such as electrode material or current collector material.

In some embodiments, the binder is a water soluble binder. In some embodiments, the binder is styrene-butadiene rubber (SBR), carboxymethyl cellulose (CMC), polyphosphoric acid (PPA) or their derivatives, or mixture thereof and is thermally decomposed during the first heat treatment above the thermal decomposition temperature of the binder.

In some embodiments, the first heat treatment can be performed in a controlled gas environment. Various gas environments can react with different battery components in different ways, resulting in different outputs of the heating operation. In some embodiments, the gas environment is inert. In some embodiments, the gas environment can include $N_2$, Ar, or other similar gas. In some embodiments, the gas environment can include $CO_2$. In some embodiments, the gas environment is a reducing environment. In some embodiments, the gas environment can include $H_2$, a mixture of Ar and $H_2$, a mixture of $N_2$ and $H_2$, or a mixture of $CO_2$ and CO. A reducing or inert environment can prevent certain battery components, such as a copper current collector, from oxidizing. In some embodiments, the gas environment can include an oxidizing environment. An oxidizing environment can assist in the removal of organic compounds. In some embodiments, air or other aforementioned gas flows through the heating chamber. In some embodiments, no gas flows through the heating chamber.

In some embodiments, the environment of the heating chamber can include about 0 vol %, about 1 vol %, about 2 vol %, about 3 vol %, about 4 vol %, about 5 vol %, about 6 vol %, about 7 vol %, about 8 vol %, about 9 vol %, about 10 vol %, about 12 vol %, about 13 vol %, about 14 vol %, about 15 vol %, about 16 vol %, about 17 vol %, about 18 vol %, about 19 vol %, about 20 vol %, about 21 vol %, about 22 vol %, about 23 vol %, about 24 vol %, or about 25 vol % $O_2$, inclusive of all values and ranges therebetween. In some embodiments, the gas environment can include an elevated amount of oxygen. In some embodiments, the gas environment can include pure oxygen or oxygen of a high purity. In some embodiments, the gas environment can include about 30 vol %, about 35 vol %, about 40 vol %, about 45 vol %, about 50 vol %, about 55 vol %, about 60 vol %, about 65 vol %, about 70 vol %, about 75 vol %, about 80 vol %, about 85 vol %, about 90 vol %, about 95 vol %, or about 100 vol % $O_2$, inclusive of all values and ranges therebetween.

In some embodiments, the first heat treatment can have a duration of at least about 30 seconds, at least about 1 minute, at least about 2 minutes, at least about 3 minutes, at least about 4 minutes, at least about 5 minutes, at least about 6 minutes, at least about 7 minutes, at least about 8 minutes, at least about 9 minutes, at least about 10 minutes, at least about 15 minutes, at least about 20 minutes, at least about 25 minutes, at least about 30 minutes, at least about 35 minutes, at least about 40 minutes, at least about 45 minutes, at least about 50 minutes, at least about 55 minutes, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 12 hours, at least about 14 hours, at least about 16 hours, at least about 18 hours, or at least about 20 hours. In some embodiments, the first heat treatment can have a duration of no more than about 21 hours, no more than about 19 hours, no more than about 17 hours, no more than about 15 hours, no more than about 13 hours, no more than about 11 hours, no more than about 10 hours, no more than about 9 hours, no more than about 8 hours, no more than about 7 hours, no more than about 6 hours, no more than about 5 hours, no more than about 4 hours, no more than about 3 hours, no more than about 2 hours, no more than about 1 hour, no more than about 55 minutes, no more than about 50 minutes, no more than about 45 minutes, no more than about 40 minutes, no more than about 35 minutes, no more than about 30 minutes, no more than about 25 minutes, no more than about 20 minutes, no more than about 15 minutes, no more than about 10 minutes, no more than about 9 minutes, no more than about 8 minutes, no more than about 7 minutes, no more than about 6 minutes, no more than about 5 minutes, no more than about 4 minutes, no more than about 3 minutes, no more than about 2 minutes, or no more than about 1 minute. Combinations of the above-referenced durations are also possible (e.g., at least about 30 seconds and no more than about 21 hours or at least about 2 minutes and no more than about 4 minutes), inclusive of all values and ranges therebetween. In some embodiments, the first heat treatment can have a duration of about 30 seconds, about 1 minute, about 2 minutes, about 3 minutes, about 4 minutes, about 5 minutes, about 6 minutes, about 7 minutes, about 8 minutes, about 9 minutes, about 10 minutes, about 15 minutes, about 20 minutes, about 25 minutes, about 30 minutes, about 35 minutes, about 40 minutes, about 45 minutes, about 50 minutes, about 55 minutes, about 1 hour, about 2 hours, about 3 hours, about 4 hours, about 5 hours, about 6 hours, about 7 hours, about 8 hours, about 9 hours, about 10 hours, about 12 hours, about 14 hours, about 16 hours, about 18 hours, about 20 hours, or about 21 hours.

In some embodiments, at least about 80 wt %, at least about 81 wt %, at least about 82 wt %, at least about 83 wt %, at least about 84 wt %, at least about 85 wt %, at least about 86 wt %, at least about 87 wt %, at least about 88 wt %, at least about 89 wt %, at least about 90 wt %, at least about 91 wt %, at least about 92 wt %, at least about 93 wt %, at least about 94 wt %, at least about 95 wt %, at least about 96 wt %, at least about 97 wt %, at least about 98 wt %, or at least about 99 wt % of the binder can be removed from the battery waste during the first heat treatment at step 13. In some embodiments, no more than about 100 wt %, no more than about 99 wt %, no more than about 98 wt %, no more than about 97 wt %, no more than about 96 wt %, no more than about 95 wt %, no more than about 94 wt %, no more than about 93 wt %, no more than about 92 wt %, no more than about 91 wt %, or no more than about 90 wt %, no more than about 89 wt %, no more than about 88 wt %, no more than about 87 wt %, no more than about 86 wt %, no more than about 85 wt %, no more than about 84 wt %, no more than about 83 wt %, no more than about 82 wt %, or no more than about 81 wt % of the binder can be removed from the battery waste during the first heat treatment at step 13. Combinations of the above-referenced weight percentages are also possible (e.g., at least about 80 wt % and no more than about 100 wt % or at least about 85 wt % and no more than about 95 wt %), inclusive of all values and ranges therebetween. In some embodiments, about 80 wt %, about 81 wt %, about 82 wt %, about 83 wt %, about 84 wt %, about 85 wt %, about 86 wt %, about 87 wt %, about 88 wt %, about 89 wt %, about 90 wt %, about 91 wt %, about 92 wt %, about 93 wt %, about 94 wt %, about 95 wt %, about 96 wt %, about 97 wt %, about 98 wt %, about 99 wt %, or about 100 wt % of the binder can be removed from the battery waste during the first heat treatment at step 13.

Step 14 is optional and includes processing exhaust gas from the first heat treatment. In some embodiments, the processing can include purifying the gas exhaust (e.g., via a cleaning operation). In some embodiments, the purification can be via scrubbing (i.e., with a gas scrubber). In some embodiments, the exhaust gas can be purified via a gas washer. After the gas processing, a cleaned gas can be released into the atmosphere or captured.

In some embodiments, step 14 can be used to meet certain environmental standards or remove the amount of hazardous or undesirable materials exhausted from the heat treatment operation. In some embodiments, step 14 can include a gas washing operation. In some embodiments, the cleaning operation removes acidic components from the exhaust gas. In some embodiments, the cleaning operation removes organic compounds, including volatile organic compounds (VOCs), fluorocarbons, or hydrofluorocarbons. In some embodiments, the cleaning operation utilizes a thermal oxidizer to remove VOCs.

Step 15 includes separating the electrode material from the current collector. During step 15, the battery waste can be separated into one or more components or groups of components. In some embodiments, this separation is performed through a particle size separation method (such as sieving) by utilizing the difference in particle size between the electrode material and the current collector. In some embodiments, the current collector can be divided into smaller pieces before step 15. In some embodiments, the separation of the electrode material from the current collector can be via a physical method. In some embodiments, the physical method can include shaking, ultrasonication, liquid washing/flushing, gas jetting, or any combination thereof. In some embodiments, the current collectors and the electrode materials can be collected separately. In some embodiments, the separated electrode materials can include other components such as residual organics (e.g., carbon or carbon compounds) or current collector (e.g., aluminum or copper). In some embodiments, the separated electrode materials can contain minor quantities of other components such as residual organics (e.g., carbon or carbon compounds) or current collector (e.g., aluminum or copper). In some embodiments, the electrode materials (along with any additives mixed in with the electrode materials) and the current collectors (or other larger particle battery components) can be physically separated from each other and collected separately. The removal of the binder in the electrode in a preceding operation can be advantageous in the efficient separation of electrode materials and current collectors.

Step 16 is optional and includes floating the electrode material to separate residual impurities. During step 16, residual impurities are separated from the electrode material based on hydrophobicity using froth flotation. In some embodiments, a mixture of cathode and anode material (if the electrode material contains both) can be separated via the flotation operation. Flotation separation includes a solvent (e.g., a polar solvent, such as water) mixed with an enhancer promoting hydrophobicity of other materials (e.g., kerosene) and a foaming agent (e.g., long chain alcohols, 4-methyl-2-pentanol, pine oil). The enhancer preferentially binds to the components that are hydrophobic. The solvent is aerated to produce a froth comprising primarily of the enhancer, foaming agent, and hydrophobic components. The froth can be separated from the solution via a scraping or any other surface collection method. The hydrophilic components are then collected from the solution separately. In these instances, the cathode materials have a different level of hydrophobicity from some of the other components. For example, cathode materials, such as $LiCoO_2$, tend to be hydrophilic, while some anode materials, such as graphite, tend to be hydrophobic. Therefore, the anode materials can be removed from the froth, and the cathode materials are collected from the solution underlying the froth. In some embodiments, other additives, such as pH regulators (e.g., sodium carbonate, sodium hydroxide, lithium carbonate, and lithium hydroxide), deflocculants, and depressants (used to increase hydrophilicity of certain compounds, e.g., lime, sodium cyanide, and dextrin) may be used to further promote separation. Additional descriptions of froth flotation processes can be found in U.S. Pat. No. 11,631,909, ("the '909 patent"), filed Nov. 26, 2019 and titled "Methods and Systems for Scalable Direct Recycling of Batteries," the disclosure of which is incorporated herein by reference in its entirety.

Step 17 is optional and includes applying a surface treatment to the electrode material. The surface treatment can modify and optimize the surface morphology of the electrode material by removing unfavorable surface coatings or impurities (such as inactive secondary phases) from the electrode material or altering the surface structure or chemistry of the electrode material. These impurities can form under a variety of circumstances, including, but not limited to, battery manufacturing, exposure to different atmospheres or humidity, or during a preceding operation during the recycling process. The modification and optimization of the surface morphology of the electrode materials during this surface treatment operation can improve the performance of the recovered or regenerated electrode materials. The modification and optimization of the surface morphology of the electrode materials during this surface treatment operation can also assist in more facile relithiation during subsequent heat treatment operations. The modified surface can allow the more facile introduction of lithium into the structure of the electrode from a lithium source. In some embodiments, the surface treatment can include addition of a weak acid or a weak base to the electrode material. In some embodiments, the surface treatment can include addition of an acid or a base to the electrode material. The acid can include acetic acid, citric acid, oxalic acid, malic acid, ascorbic acid, or any combination thereof. The base can include ammonia, LiOH, NaOH, KOH, or any combination thereof.

In some embodiments, the applying a surface treatment to the electrode material can have a duration of at least about 30 seconds, at least about 1 minute, at least about 2 minutes, at least about 3 minutes, at least about 4 minutes, at least about 5 minutes, at least about 6 minutes, at least about 7 minutes, at least about 8 minutes, at least about 9 minutes, at least about 10 minutes, at least about 15 minutes, at least about 20 minutes, at least about 25 minutes, at least about 30 minutes, at least about 35 minutes, at least about 40 minutes, at least about 45 minutes, at least about 50 minutes, at least about 55 minutes, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 12 hours, at least about 14 hours, at least about 16 hours, at least about 18 hours, at least about 20 hours, at least about 25 hours, or at least about 30 hours. In some embodiments, the applying a surface treatment to the electrode material can have a duration of no more than about 31 hours, no more than about 26 hours, no more than about 21 hours, no more than about 19 hours, no more than about 17 hours, no more than about 15 hours, no more than about 13 hours, no more than about 11 hours, no more than about 10 hours, no more than about 9 hours, no more than about 8 hours, no more than about 7 hours, no more than about 6 hours, no more than about 5 hours, no more than about 4 hours, no more than about 3 hours, no more than about 2 hours, no more than about 1 hour, no more than about 55 minutes, no more than about 50 minutes, no more than about 45 minutes, no more than about 40 minutes, no more than about 35 minutes, no more than about 30 minutes, no more than about 25 minutes, no more than about 20 minutes, no more than about 15 minutes, no more than about 10 minutes, no more than about 9 minutes, no more than about 8 minutes, no more than about 7 minutes, no more than about 6 minutes, no more than about 5 minutes, no more than about 4 minutes, no more than about 3 minutes, no more than about 2 minutes, or no more than about 1 minute. Combinations of the above-referenced durations are also possible (e.g., at least about 30 seconds and no more than about 31 hours or at least about 2 minutes and no more than about 4 minutes), inclusive of all values and ranges therebetween. In some embodiments, the applying a surface treatment to the electrode material can have a duration of about 30 seconds, about 1 minute, about 2 minutes, about 3 minutes, about 4 minutes, about 5 minutes, about 6 minutes, about 7 minutes, about 8 minutes, about 9 minutes, about 10 minutes, about 15 minutes, about 20 minutes, about 25 minutes, about 30 minutes, about 35 minutes, about 40 minutes, about 45 minutes, about 50 minutes, about 55 minutes, about 1 hour, about 2 hours, about 3 hours, about 4 hours, about 5 hours, about 6 hours, about 7 hours, about 8 hours, about 9 hours, about 10 hours, about 12 hours, about 14 hours, about 16 hours, about 18 hours, about 20 hours, about 25 hours, or about 30 hours.

In some embodiments, the applying a surface treatment to the electrode material can be performed at a temperature of at least about 20° C., at least about 30° C., at least about 40° C., at least about 50° C., at least about 60° C., at least about 70° C., at least about 80° C., or at least about 90° C. In some embodiments, the applying a surface treatment to the electrode material can be performed at a temperature of no more than about 100° C., no more than about 90° C., no more than about 80° C., no more than about 70° C., no more than about 60° C., no more than about 50° C., no more than about 40°

C., or no more than about 30° C. Combinations of the above-referenced temperatures are also possible (e.g., at least about 20° C. and no more than about 100° C. or at least about 40° C. and no more than about 60° C.), inclusive of all values and ranges therebetween. In some embodiments, the applying a surface treatment to the electrode material can be performed at a temperature of about 20° C., about 30° C., about 40° C., about 50° C., about 60° C., about 70° C., about 80° C., about 90° C., or about 100° C.

In some embodiments, the solution applied in the surface treatment can have a pH of at least about 5, at least about 6, at least about 7, or at least about 8, at least about 9, at least about 10, or at least about 11. In some embodiments, the solution used to remove impurities from the electrode material can have a pH of no more than about 12, no more than about 11, no more than about 10, no more than about 9, no more than about 8, no more than about 7, or no more than about 6. Combinations of the above-referenced pH values are also possible (e.g., at least about 5 and no more than about 12 or at least about 6 and no more than about 8), inclusive of all values and ranges therebetween. In some embodiments, the solution can have a pH of about 5, about 6, about 7, about 8, or about 9.

In some embodiments, the surface treatment can be performed in a controlled gas environment. In some embodiments, the gas environment can be inert. In some embodiments, the gas environment can include $N_2$ Ar, or other similar gas. In some embodiments, the gas environment can include $CO_2$. In some embodiments, the gas environment can be reducing. In some embodiments, the gas environment can include $H_2$, a mixture of Ar and $H_2$, a mixture of $N_2$ and $H_2$, or a mixture of $CO_2$ and CO. In some embodiments, the gas environment can include an oxidizing environment. An oxidizing environment can assist in the removal of organic compounds. In some embodiments, air or other aforementioned gas flows along or through the battery waste during the surface treatment. In some embodiments, no gas flows along or through the battery waste during the surface treatment. In some embodiments, the surface treatment can be performed under increased gas pressure. In some embodiments, the surface treatment can be performed under decreased gas pressure.

In some embodiments, the gas environment can include about 0 vol %, about 1 vol %, about 2 vol %, about 3 vol %, about 4 vol %, about 5 vol %, about 6 vol %, about 7 vol %, about 8 vol %, about 9 vol %, about 10 vol %, about 12 vol %, about 13 vol %, about 14 vol %, about 15 vol %, about 16 vol %, about 17 vol %, about 18 vol %, about 19 vol %, about 20 vol %, about 21 vol %, about 22 vol %, about 23 vol %, about 24 vol %, or about 25 vol % $O_2$, inclusive of all values and ranges therebetween. In some embodiments, the gas environment can include an elevated amount of oxygen. In some embodiments, the gas environment can include pure oxygen or oxygen of a high purity. In some embodiments, the gas environment can include about 30 vol %, about 35 vol %, about 40 vol %, about 45 vol %, about 50 vol %, about 55 vol %, about 60 vol %, about 65 vol %, about 70 vol %, about 75 vol %, about 80 vol %, about 85 vol %, about 90 vol %, about 95 vol %, or about 100 vol % $O_2$, inclusive of all values and ranges therebetween.

At step 18, a second heat treatment step completes the recovery of the electrode material. The second heat treatment can increase the purity of the recovered electrode material. In some embodiments, residual carbon and residual organic compounds can be thermally decomposed and vaporized during step 18. Additionally, the electrode materials can experience a loss of lithium under a variety of circumstances, including, but not limited to, battery manufacturing, exposure to different atmospheres or humidity, or during a preceding operation during the recycling process. In some embodiments, the second heat treatment operation can include a relithiation operation to restore the lithium concentration in the electrode material to a commercially usable stoichiometry. In some embodiments, the relithiation can include homogeneously mixing the electrode material with an additional lithium source (e.g., LiOH, $Li_2CO_3$) prior to, during, and/or after the heat treatment. The relithiation of the active materials can then be completed via solid-state synthesis during the heat treatment. Such a synthesis can be in the form of healing structural damage of the electrode material.

In some embodiments, the stoichiometric lithium loss of the electrode material prior to the lithiation can be between about 0% and about 10%, between about 10% and about 20%, between about 20% and about 30%, between about 30% and about 40%, or between about 40% and about 50%. In some embodiments, the lithium loss of electrode material prior to relithiation is quantified using a common elemental quantification or structural tool, such as inductively couple plasma mass spectrometry or x-ray diffraction, or electrochemically, such as with open circuit voltage or capacity measurements. In some embodiments, the delithiation operation can be performed without a second heat treatment operation. In some embodiments, the electrode material can undergo a grinding step to reduce electrode material particle size or break up agglomerations prior to the second heat treatment operation.

In some embodiments, step 18 can include a delithiation operation to remove excess lithium in the electrode material. In some embodiments, the delithiation operation can include washing the electrode material in solvent that can remove and dissolve the excess lithium. In some embodiments, the solvent can include water. In some embodiments, the electrode material can be washed in an aqueous solution.

In some embodiments, the second heat treatment operation at step 18 can be performed in a controlled gas environment. Different gas environments can react with various battery components in different ways, resulting in different products. In some embodiments, the gas environment can be inert. In some embodiments, the gas environment can include $N_2$, Ar, or any other similar gas. In some embodiments, the gas environment can be a reducing gas environment. A reducing or inert environment can assist in the better performance of certain electrode materials, such as LFP. In some embodiments, the gas environment can include $CO_2$. In some embodiments, the gas environment can include $H_2$, a mixture of Ar and $H_2$, a mixture of $N_2$ and $H_2$, or a mixture of $CO_2$ and CO.

In some embodiments, the gas environment can be an oxidizing environment. An oxidizing environment can assist in the better performance of certain electrode materials, such as mixed transitional metal cathode (e.g., various compositions of lithium nickel cobalt manganese oxide). In some embodiments, the oxidizing environment comprises oxygen. In some embodiments, the oxidizing environment can include oxygen in a concentration higher than in ambient air. In some embodiments, the oxidizing environment can include at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, or at least about 95 vol % oxygen. In some embodiments, the oxidizing environment can include pure oxygen. In some embodiments, the oxidizing environment can include at least about 99 vol %, at least about 99.9 vol %, at least about 99.99 vol %, or at least about 99.999 vol % oxygen. In some embodiments, a reducing gas, air, and/or an oxidizing gas can be flowed through a heating chamber where the second heat treatment occurs during step 18. In some embodiments, a gas is not flowed through the heating chamber.

The second heat treatment operation can be performed at various temperature and different lengths of time. These parameters can change depending on the type of material being processed during this heat treatment operation. In some embodiments, the second heat treatment operation is performed at a temperature of at least about 400° C., at least about 500° C., at least about 600° C., at least about 700° C., at least about 800° C., at least about 900° C., at least about 1,000° C., or at least about 1,100° C. In some embodiments, the second heat treatment operation is performed at a temperature of no more than about 1,200° C., no more than about 1,100° C., no more than about 1,000° C., no more than about 900° C., no more than about 800° C., no more than about 700° C., no more than about 600° C., or no more than about 500° C. Combinations of the above-referenced temperatures are also possible (e.g., at least about 400° C. and no more than about 1,200° C. or at least about 600° C. and no more than about 900° C.), inclusive of all values and ranges therebetween. In some embodiments, the second heat treatment operation can be performed at a temperature of about 400° C., about 500° C., about 600° C., about 700° C., about 800° C., about 900° C., about 1,000° C., about 1,100° C., or about 1,200° C.

In some embodiments, the second heat treatment can have a duration between about 1 hour and about 2 hours, between about 2 hours and about 3 hours, between about 3 hours and about 4 hours, between about 4 hours and about 5 hours, between about 5 hours and about 7 hours, between about 7 hours and about 10 hours, or between about 10 hours and about 15 hours. In some embodiments, the second heat treatment can have a duration of at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours, at least about 13 hours, or at least about 14 hours. In some embodiments, the second heat treatment can have a duration of no more than about 15 hours, no more than about 14 hours, no more than about 13 hours, no more than about 12 hours, no more than about 11 hours, no more than about 10 hours, no more than about 9 hours, no more than about 8 hours, no more than about 7 hours, no more than about 6 hours, no more than about 5 hours, no more than about 4 hours, no more than about 3 hours, or no more than about 2 hours. Combinations of the above-referenced durations are also possible (e.g., at least about 1 hour and no more than about 15 hours or at least about 4 hours and no more than about 10 hours), inclusive of all values and ranges therebetween. In some embodiments, the second heat treatment can have a duration of about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, or about 15 hours.

In some embodiments, the temperature, duration, and atmosphere of the second heat treatment can depend on the cathode material. For example, LFP electrodes can be regenerated at a temperature between about 450° C. and about 800° C. with a duration between about 1 hour and about 12 hours. Additionally, NCM electrodes can be regenerated at a temperature between about 600° C. and about 900° C. with a duration between about 3 hours and about 15 hours.

In some embodiments, the second heat treatment can include a heat treatment operation that includes a relithiation process can be performed with an excess-lithium method. The excess-lithium method can reduce or eliminate the need to exactly quantify the lithium deficiency of the electrode material prior to applying the regeneration method 10. This method can include a mixing of the lithium-deficient electrode material with a lithium source that is in excess of the stoichiometric lithium-deficiency of the electrode material. The electrode material mixed with an excess lithium source can then be subject to a heat treatment operation. This heat treatment operation can performed at one or more of the temperature ranges mentioned above for the second heat treatment and can enable relithiation of the electrode material.

In some embodiments, the second heat treatment can result in a vaporization of at least about 95 wt %, at least about 96 wt %, at least about 97 wt %, at least about 98 wt %, at least about 99 wt %, at least about 99.5 wt %, at least about 99.9 wt %, at least about 99.99 wt %, or at least about 99.999 wt % of the binder originally present in the electrode material prior to execution of the method 10. In some embodiments, the second heat treatment can result in a vaporization of at least about 95 wt %, at least about 96 wt %, at least about 97 wt %, at least about 98 wt %, at least about 99 wt %, at least about 99.5 wt %, at least about 99.9 wt %, at least about 99.99 wt %, or at least about 99.999 wt % of the binder present in the electrode material after the first heat treatment at step 13. In some embodiments, the second heat treatment can result in a vaporization of all or substantially all o the binder originally present in the electrode material prior to execution of the method 10.

After the second heat treatment, the electrode material can undergo a washing process in solvent. The solvent is able to dissolve and/or remove any excess lithium from the electrode material. In some embodiments, the solvent can include water. In some embodiments, an aqueous or water-based solution can be used to wash the electrode material. In some embodiments, the electrode material can undergo a third heat treatment operation (not shown). This heat treatment operation can complete the regeneration process and improve the performance of the electrode material. In some embodiments, the third heat treatment operation can be performed at temperatures in the same ranges as the second heat treatment operation mentioned above.

Step 19 is optional and includes processing exhaust gas from the second heat treatment. In some embodiments, the processing can include purifying the gas exhaust (e.g., via a cleaning operation). In some embodiments, the purification can be via scrubbing (i.e., with a gas scrubber). In some embodiments, the exhaust gas can be purified via a gas washer. After the gas processing, a cleaned gas can be released into the atmosphere or captured.

In some embodiments, step 19 can be used to meet certain environmental standards or remove the amount of hazardous or undesirable materials exhausted from the heat treatment operation. In some embodiments, step 19 can include a gas washing operation. In some embodiments, the cleaning operation removes acidic components from the exhaust gas. In some embodiments, the cleaning operation removes organic compounds, including VOCs, fluorocarbons, or hydrofluorocarbons. In some embodiments, the cleaning operation utilizes a thermal oxidizer to remove VOCs.

In some embodiments, the method 10 can yield purified and regenerated cathode or anode material. In some embodiments, the method 10 can yield purified and regenerated cathode or anode material by isolating the cathode or anode material from other battery components such as current collectors, separators, packaging, electrolyte, lithium salts, or certain additives. In some embodiments, the method 10 can yield commercial-grade electrode material without the need for exact quantification of lithium deficiency prior to relithiation. In some embodiments, the method 10 can be used to separate, purify, and regenerate cathode and/or anode powder from other battery waste components.

In some embodiments, the method 10 can yield functional cathode and/or anode materials. In some embodiments, current collector, separator, packaging material, and other battery components can undergo further sorting and separation to be recovered. In some embodiments, magnetic separation can be used to separate ferrous metals from other materials. In some embodiments, an eddy current separation process can be used to separate nonferrous metals from other materials. In some embodiments, density-based separation can be used to separate materials of different densities.

Figure 2A:
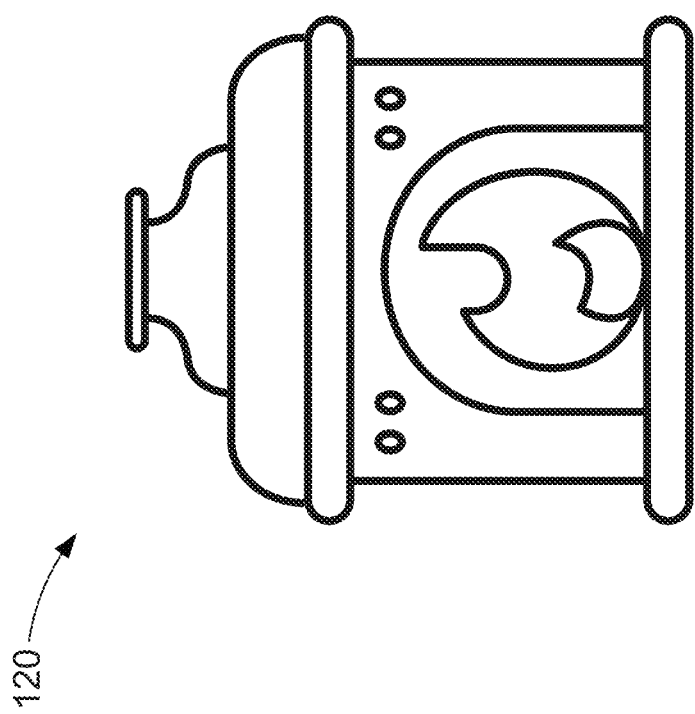

FIGS. 2A-2B are illustrations of a muffle furnace 120 for heat treatment of battery waste, according to an embodiment. FIG. 2A shows a perspective view of the muffle furnace 120, while FIG. 2B shows a detailed schematic view of the muffle furnace 120. As shown, the muffle furnace 120 includes a gas inlet 121, a gas outlet 122, a thermocouple 123, and a muffle 124. In operation, the battery waste or portions thereof can be placed inside the muffle furnace 120. Gas flows into the muffle furnace 120 via the gas inlet 121, and out of the muffle furnace 120 via the gas outlet 122. The gas can have any of the compositions described above with reference to the first heat treatment, the second heat treatment, and/or the third heat treatment of the method 10. The thermocouple 123 measures the temperature inside the muffle furnace 120, while the muffle 124 holds heat inside the muffle furnace 120 during operation.

The flow rate of gas into and out of the muffle furnace 120 can be controlled to influence the gaseous environment inside the muffle furnace 120. In some embodiments, the gas flow rate into and out of the muffle furnace 120 can be at least about 1 SCCM, at least about 5 SCCM, at least about 10 SCCM, at least about 50 SCCM, at least about 100 SCCM, at least about 500 SCCM, at least about 1,000 SCCM, at least about 5,000 SCCM, at least about 10,000 SCCM, at least about 50,000 SCCM, at least about 100,000 SCCM, or at least about 500,000 SCCM. In some embodiments, the gas flow rate into and out of the muffle furnace 120 can be no more than about 1,000,000 SCCM, no more than about 500,000 SCCM, no more than about 100,000 SCCM, no more than about 50,000 SCCM, no more than about 10,000 SCCM, no more than about 5,000 SCCM, no more than about 1,000 SCCM, no more than about 500 SCCM, no more than about 100 SCCM, no more than about 50 SCCM, no more than about 10 SCCM, or no more than about 5 SCCM. Combinations of the above-referenced gas flow rates are also possible (e.g., at least about 1 SCCM and no more than about 1,000,000 SCCM or at least about 500 SCCM and no more than about 50,000 SCCM), inclusive of all values and ranges therebetween. In some embodiments, the gas flow rate into and out of the muffle furnace 120 can be about 1 SCCM, about 5 SCCM, about 10 SCCM, about 50 SCCM, about 100 SCCM, about 500 SCCM, about 1,000 SCCM, about 5,000 SCCM, about 10,000 SCCM, about 50,000 SCCM, about 100,000 SCCM, about 500,000 SCCM, or about 1,000,000 SCCM.

Figure 3A:
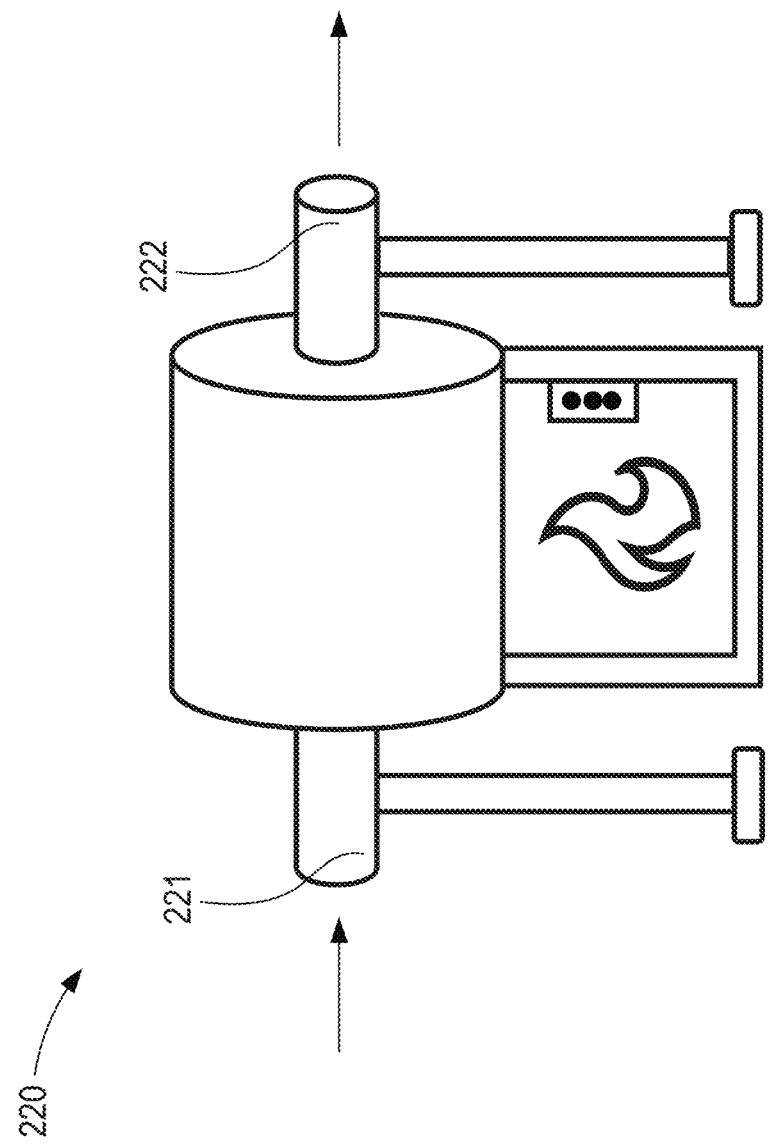
FIGS. 3A-3B are illustrations of a tube for heat treatment of battery waste, according to an embodiment.
Figure 3B:
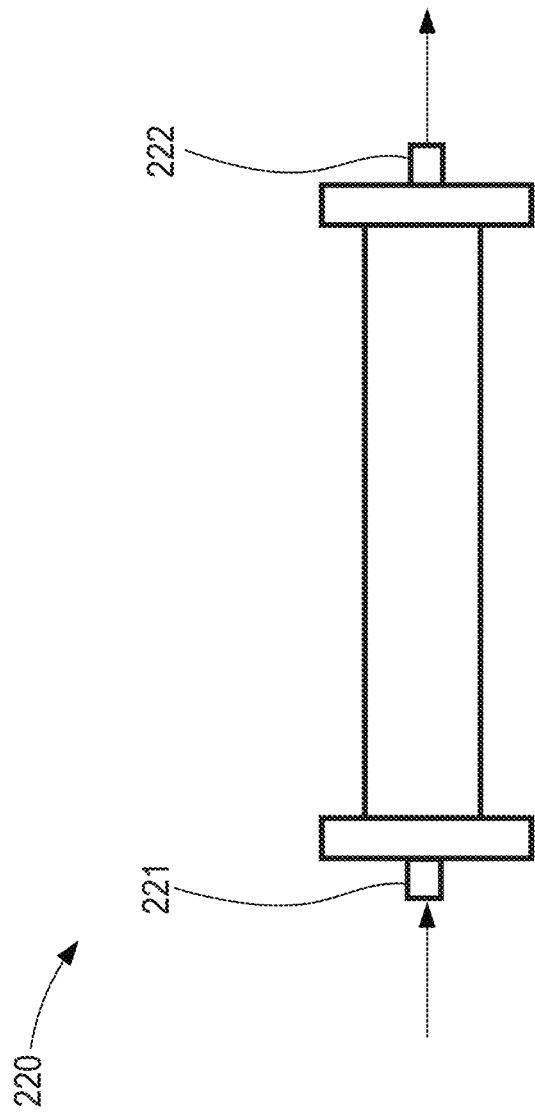

FIGS. 3A-3B are illustrations of a tube furnace 220 for heat treatment of battery waste, according to an embodiment. FIG. 3A shows a perspective view of the tube furnace 220, while FIG. 3B shows a detailed schematic view of the tube furnace 220. As shown, the tube furnace 220 includes a gas inlet 221 and a gas outlet 222. In some embodiments, the gas inlet 221 and the gas outlet 222 can be the same or substantially similar to the gas inlet 121 and the gas outlet 222, as described above with reference to FIGS. 2A-2B.

In some embodiments, a roller hearth kiln (not shown) can be used for the heat treatment operations. The roller hearth kiln can have gas flow in and out to enable various gas environments or gas flow rates during heat treatment. In some embodiments, a rotary kiln can be used for the heat treatment operations. The rotary kiln can have gas flow in and out to enable various gas environments or gas flow rates during heat treatment.

Figure 4A:
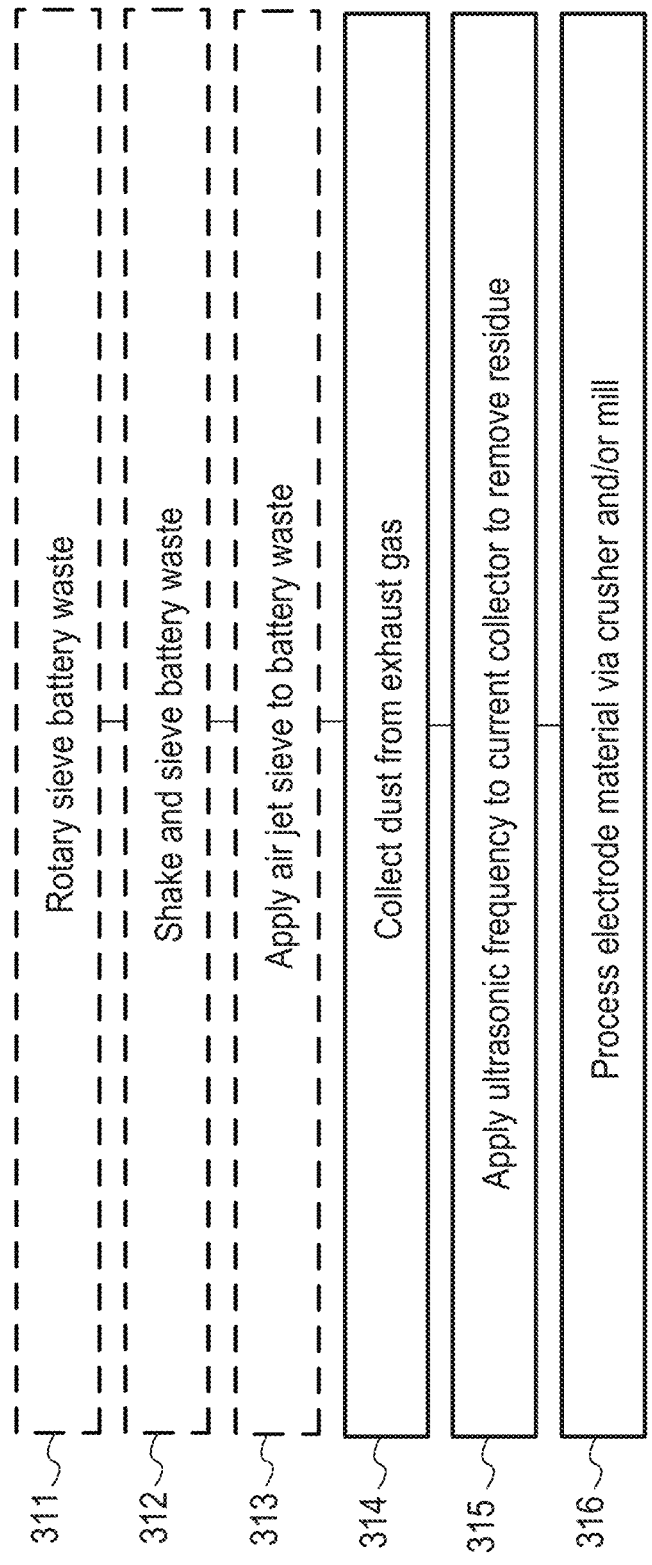
FIG. 4A is a flow diagram of a method of processing battery waste, according to an embodiment.

FIG. 4A is a flow diagram of a method 310 of processing battery waste, according to an embodiment. In some embodiments, the method 310 can include a separation operation performed in a dry fashion, without the assistance of an added liquid. As shown, the method 310 optionally includes rotary sieving battery waste at step 311, shaking and sieving the battery waste at step 312, and applying an air jet sieve to the battery waste at step 313. The method 310 includes collecting dust from exhaust gas at step 314, applying an ultrasonic frequency to the current collector to remove residue at step 315, and processing the electrode material via a crusher and/or a mill at step 316.

Step 311 is optional and includes rotary sieving the battery waste. In some embodiments, the rotary sieving can be via a trommel screen. The rotary sieving can separate electrode materials from current collectors. In some embodiments, the method 310 can include shaking and ultrasonication sieving the battery waste (step 312), air-jet sieving (step 313), or other similar separation methods instead of or in addition to rotary sieving. Step 311 produces two material streams through sieving or other similar particle-size-based separation, one primarily including electrode materials (along with any additives mixed in with the electrode materials) and another primarily including the current collectors (or other larger particle battery components). In some embodiments, the rotary sieving (trommel screen), shaking and ultrasonication sieving and/or air-jet sieving can be operated without the use of liquid.

In some embodiments, step 311, step 312, and/or step 313 can produce exhaust gas. Step 314 includes collecting dust from the exhaust gas. In some embodiments, the waste gas stream can be processed and/or cleaned. In some embodiments, the processing and/or cleaning of the waste gas stream can include collection of dust via a dust collector. In some embodiments, the waste gas stream processing can include any of the processes described above in steps 14 and 19, with respect to FIG. 1.

The material stream emerging from the rotary sieving, the shaking and sieving, and/or the air jet sieve that includes mostly current collectors (or other larger particle battery components) with residue are further processed at step 315 via ultrasonication. The ultrasonication aids in further separating any residual small-particle materials from the current collectors. In some embodiments, the current collector stream can be further separated from other components based on chemical, physical, and/or ferromagnetic properties of the current collector materials. For example, the current collector stream can be processed via magnetic separation, eddy current separation, and/or density-based separation. In some embodiments, the current collector stream can be subject to no ultrasonic separation step but can undergo a separation based on the metallic or other physical/chemical properties of the current collectors (e.g., magnetic, eddy current, and/or density-based separation)

At step 316, the electrode material can undergo a crushing and/or milling process to reduce particle size and/or agglomerating of the electrode material. This can produce a smaller-particle electrode material for further processing. In some embodiments, residue powder from the dust collection from the exhaust gas can be added to the smaller-particle electrode material stream before and/or after feeding the electrode material to the crusher and/or mill.

Figure 5A:
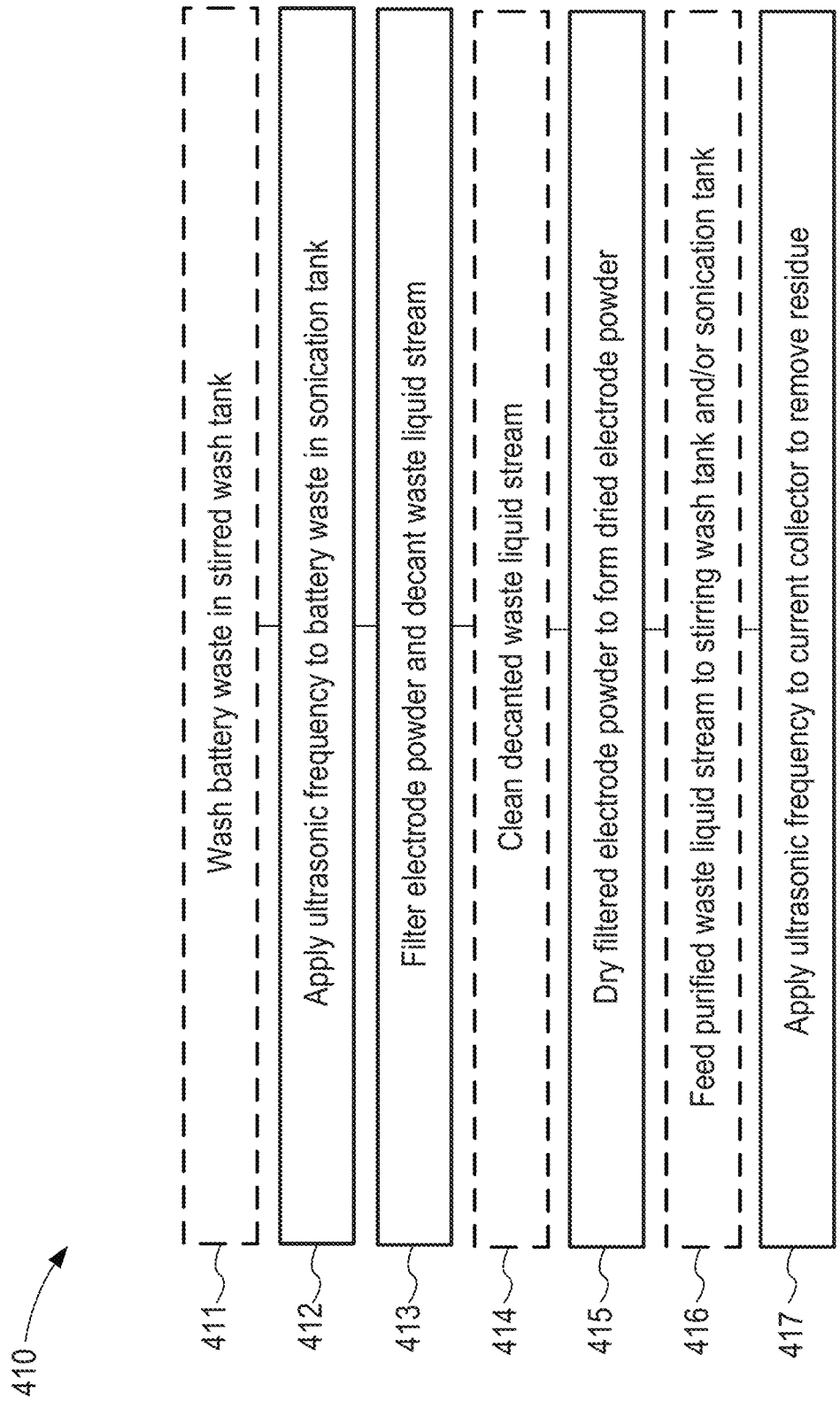
FIG. 5A is a flow diagram of a method of processing battery waste, according to an embodiment.

FIG. 5A is a flow diagram of a method 410 of processing battery waste, according to an embodiment. The method 410 is a wet separation method. As shown, the method 410 includes washing battery waste in a stirred wash tank at step 411 and optionally applying an ultrasonic frequency to the battery waste in a sonication tank at step 412. The method further includes filtering the electrode powder and decanting a waste liquid stream at step 413, optionally cleaning the decanted waste liquid stream at step 414, drying the filtered electrode powder to form dried electrode powder at step 415, optional feeding the purified waste liquid stream to a stirred wash tank and/or a sonication tank at step 416, and applying an ultrasonic frequency to the current collector to remove residue at step 417.

In some embodiments, the any of steps 411-417 can be performed in a controlled gas environment. In some embodiments, the gas environment can be inert. In some embodiments, the gas environment can include $N_2$ Ar, or other similar gas. In some embodiments, the gas environment can include $CO_2$. In some embodiments, the gas environment can be reducing. In some embodiments, the gas environment can include $H_2$, a mixture of Ar and $H_2$, a mixture of $N_2$ and $H_2$, or a mixture of $CO_2$ and CO. In some embodiments, the gas environment can include an oxidizing environment. An oxidizing environment can assist in the removal of organic compounds. In some embodiments, air or other aforementioned gas flows along or through the battery waste during steps 411-417. In some embodiments, no gas flows along or through the battery waste during steps 411-417.

In some embodiments, the gas environment can include about 0 vol %, about 1 vol %, about 2 vol %, about 3 vol %, about 4 vol %, about 5 vol %, about 6 vol %, about 7 vol %, about 8 vol %, about 9 vol %, about 10 vol %, about 12 vol %, about 13 vol %, about 14 vol %, about 15 vol %, about 16 vol %, about 17 vol %, about 18 vol %, about 19 vol %, about 20 vol %, about 21 vol %, about 22 vol %, about 23 vol %, about 24 vol %, or about 25 vol % $O_2$, inclusive of all values and ranges therebetween. In some embodiments, the gas environment can include an elevated amount of oxygen. In some embodiments, the gas environment can include pure oxygen or oxygen of a high purity. In some embodiments, the gas environment can include about 30 vol %, about 35 vol %, about 40 vol %, about 45 vol %, about 50 vol %, about 55 vol %, about 60 vol %, about 65 vol %, about 70 vol %, about 75 vol %, about 80 vol %, about 85 vol %, about 90 vol %, about 95 vol %, or about 100 vol % $O_2$, inclusive of all values and ranges therebetween.

Step 411 includes washing the battery waste in a stirred wash tank. In some embodiments, the stirred wash tank can include an added liquid. In some embodiments, the added liquid can include water and/or an aqueous-based solvent. In some embodiments, the added liquid can include a non-aqueous solvent, such as NMP, DMF, dimethylacetamide (DMAc or DMA), cyrene, or their derivatives, or mixtures thereof. In some embodiments, step 411 can be performed in a stirred wash tank, a wash tank utilizing ultrasonication for material de-agglomeration and agitation, and/or other similar liquid-assisted separation processes.

In some embodiments, the method 410 can include applying an ultrasonic frequency to the battery waste in a sonication tank at step 412. In some embodiments, the sonication can occur at least partially concurrently with the washing at step 411. In some embodiments, the sonication can occur in the same vessel as the washing at step 411. In some embodiments, the sonication can occur at a different location from the washing at step 411.

Step 411 and/or step 412 can produce material streams through sieving or other similar particle-size-based separation, one primary including electrode materials (along with any additives mixed in with the electrode materials), and another primarily including the current collectors (or other larger particle battery components).

At step 413, the material stream including primarily electrode materials is sieved while a waste liquid stream is decanted. Step 413 removes liquid from the electrode materials. Step 414 is optional and includes cleaning the decanted waste liquid stream. In some embodiments, the decanted waste stream can be cleaned via purification, neutralization, filtration, or any combination thereof to produce a cleaned liquid for reuse.

Step 415 includes drying the filtered electrode powder to form a dried electrode powder. In some embodiments, the drying can be via an oven. In some embodiments, the drying can be via a furnace. Step 416 is optional and includes feeding the purified waste liquid stream to the stirring wash tank and/or the sonication tank (i.e., the wash battery).

The material stream that includes mostly current collectors (or other larger particle battery components) with residue are further processed at step 417 via ultrasonication. In some embodiments, step 417 can include any of the processing steps of step 315, as described above with reference to FIG. 4A.

FIG. 5B shows illustrations of processing equipment for processing battery waste, according to various embodiments. As shown, FIG. 5B includes a stirring wash tank 460 and a sonication tank 470. In some embodiments, the stirring wash tank 460 can be employed in step 411 described above. In some embodiments, the sonication tank 470 can be employed in step 412 and/or step 417, as described above.

Figure 6:
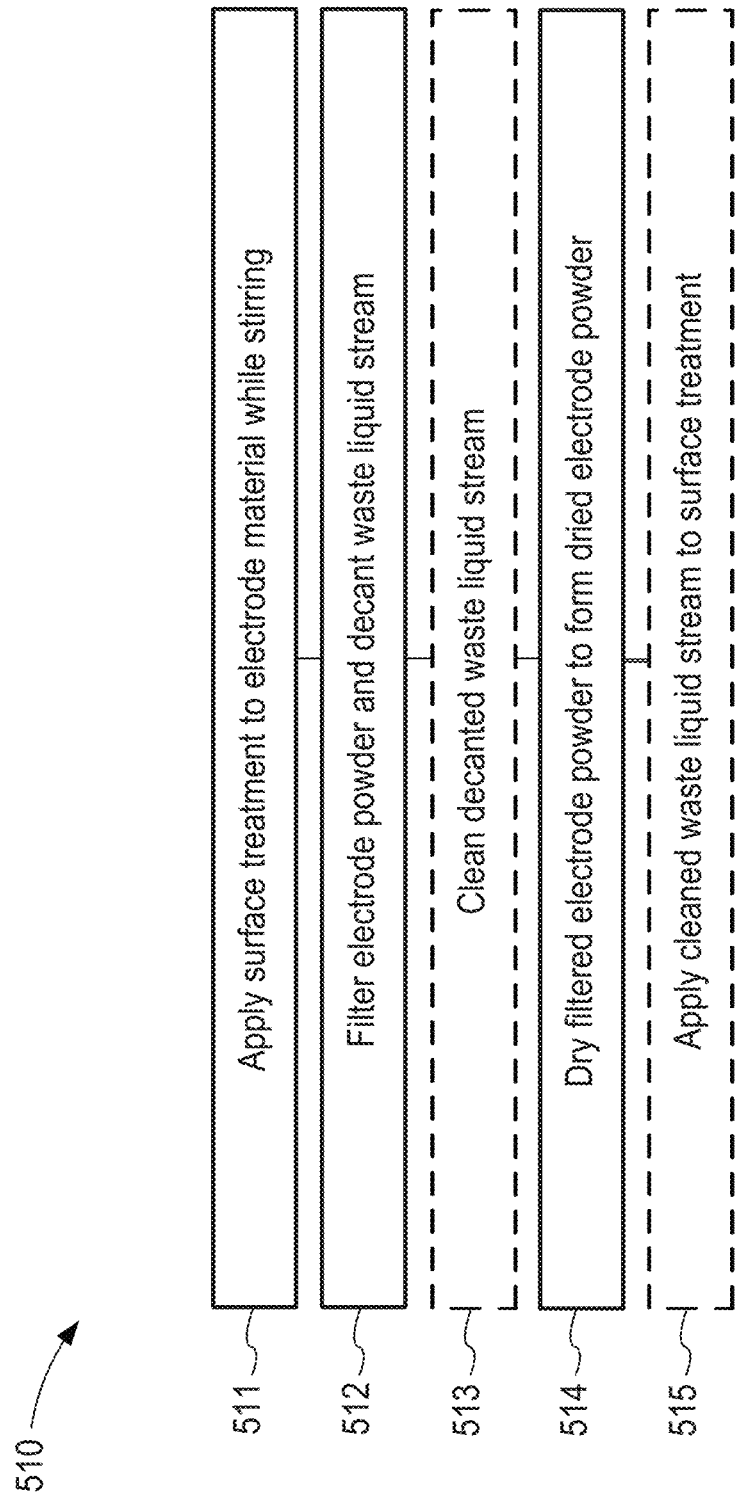
FIG. 6 is a flow diagram of a method of surface treatment of an electrode material, according to an embodiment.

FIG. 6 is a flow diagram of a method 510 of surface treating an electrode material. The method 510 is for treating dried electrode powder. As shown, the method 510 includes applying a surface treatment to an electrode material while stirring at step 511, filtering an electrode powder and decanting a waste liquid stream at step 512, optionally cleaning the decanted waste liquid stream at step 513, drying the filtered electrode powder to form a dried electrode powder at step 514, and optionally applying the cleaned waste liquid stream to the surface treatment at step 515.

In some embodiments, the any of steps 511-515 can be performed in a controlled gas environment. In some embodiments, the gas environment can be inert. In some embodiments, the gas environment can include $N_2$ Ar, or other similar gas. In some embodiments, the gas environment can include $CO_2$. In some embodiments, the gas environment can be reducing. In some embodiments, the gas environment can include $H_2$, a mixture of Ar and $H_2$, a mixture of $N_2$ and $H_2$, or a mixture of $CO_2$ and CO. In some embodiments, the gas environment can include an oxidizing environment. An oxidizing environment can assist in the removal of organic compounds. In some embodiments, air or other aforementioned gas flows along or through the battery waste during steps 511-515. In some embodiments, no gas flows along or through the battery waste during steps 511-515.

In some embodiments, the gas environment can include about 0 vol %, about 1 vol %, about 2 vol %, about 3 vol %, about 4 vol %, about 5 vol %, about 6 vol %, about 7 vol %, about 8 vol %, about 9 vol %, about 10 vol %, about 12 vol %, about 13 vol %, about 14 vol %, about 15 vol %, about 16 vol %, about 17 vol %, about 18 vol %, about 19 vol %, about 20 vol %, about 21 vol %, about 22 vol %, about 23 vol %, about 24 vol %, or about 25 vol % $O_2$, inclusive of all values and ranges therebetween. In some embodiments, the gas environment can include an elevated amount of oxygen. In some embodiments, the gas environment can include pure oxygen or oxygen of a high purity. In some embodiments, the gas environment can include about 30 vol %, about 35 vol %, about 40 vol %, about 45 vol %, about 50 vol %, about 55 vol %, about 60 vol %, about 65 vol %, about 70 vol %, about 75 vol %, about 80 vol %, about 85 vol %, about 90 vol %, about 95 vol %, or about 100 vol % $O_2$, inclusive of all values and ranges therebetween.

Step 511 includes applying a surface treatment to the electrode material while stirring. In some embodiments, surface treatment can be performed on the collected electrode materials from a separation operation (e.g., a separation performed consistent with step 15, as described above with reference to FIG. 1). In some embodiments, surface treatment can be performed on collected electrode materials from another preceding operation. In some embodiments, surface treatment can be performed on electrode materials directly received into the direct recycling process. In the surface treatment operation, the electrode materials are washed by a solvent to modify the surface of the electrode materials. This modified surface can result in better performance of the electrode materials ultimately recovered by the recycling process. In some embodiments, the solvent can include a weak acid (e.g., acetic acid, citric acid, oxalic acid, etc.).

In some embodiments, the acid concentration in the solvent can be at least about 1 wt %, at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, at least about 11 wt %, at least about 12 wt %, at least about 13 wt %, at least about 14 wt %, at least about 15 wt %, at least about 16 wt %, at least about 17 wt %, at least about 18 wt %, or at least about 19 wt %. In some embodiments, the acid concentration in the solvent can be no more than about 20 wt %, no more than about 19 wt %, no more than about 18 wt %, no more than about 17 wt %, no more than about 16 wt %, no more than about 15 wt %, no more than about 14 wt %, no more than about 13 wt %, no more than about 12 wt %, no more than about 11 wt %, no more than about 10 wt %, no more than about 9 wt %, no more than about 8 wt %, no more than about 7 wt %, no more than about 6 wt %, no more than about 5 wt %, no more than about 4 wt %, no more than about 3 wt %, or no more than about 2 wt %. Combinations of the above-referenced acid percentages are also possible (e.g., at least about 1 wt % and no more than about 20 wt % or at least about 2.5 wt % and no more than about 5 wt % or at least about 10 wt % and no more than about 20 wt % or at least about 5 wt % and no more than about 10 wt %), inclusive of all values and ranges therebetween. In some embodiments, the acid concentration in the solvent can be about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %.

The acid concentration can be optimized such that any unfavorable surface coatings on the electrode materials are dissolved, but the leaching of the electrode material itself is limited, thus largely or entirely preserving the bulk electrode material composition and structure. In some embodiments, the solvent is another stronger acid such as nitric acid, sulfuric acid, hydrochloric acid, or other similar acid. In some embodiments, the solid-liquid ratio of electrode materials to solvent can be at least about 2.5 g/100 mL, at least about 3 g/100 mL, at least about 4 g/100 mL, at least about 5 g/100 mL, at least about 6 g/100 mL, at least about 7 g/100 mL, at least about 8 g/100 mL, at least about 9 g/100 mL, at least about 10 g/100 mL, at least about 11 g/100 mL, at least about 12 g/100 mL, at least about 13 g/100 mL, at least about 14 g/100 mL, at least about 15 g/100 mL, at least about 16 g/100 mL, at least about 17 g/100 mL, at least about 18 g/100 mL, or at least about 19 g/100 mL. In some embodiments, the solid-liquid ratio of electrode materials to solvent can be no more than about 20 g/100 mL, no more than about 19 g/100 mL, no more than about 18 g/100 mL, no more than about 17 g/100 mL, no more than about 16 g/100 mL, no more than about 15 g/100 mL, no more than about 14 g/100 mL, no more than about 13 g/100 mL, no more than about 12 g/100 mL, no more than about 11 g/100 mL, no more than about 10 g/100 mL, no more than about 9 g/100 mL, no more than about 8 g/100 mL, no more than about 7 g/100 mL, no more than about 6 g/100 mL, no more than about 5 g/100 mL, no more than about 4 g/100 mL, or no more than about 3 g/100 mL. Combinations of the above-referenced solid-liquid ratios of electrode materials to solvent are also possible (e.g., at least about 2.5 g/mL and no more than about 20 g/100 mL or at least about 5 g/100 mL and no more than about 10 g/100 mL), inclusive of all values and ranges therebetween. In some embodiments, the solid-liquid ratio of electrode materials to solvent can be least about 2.5 g/100 mL, about 3 g/100 mL, about 4 g/100 mL, about 5 g/100 mL, about 6 g/100 mL, about 7 g/100 mL, about 8 g/100 mL, about 9 g/100 mL, about 10 g/100 mL, about 11 g/100 mL, about 12 g/100 mL, about 13 g/100 mL, about 14 g/100 mL, about 15 g/100 mL, about 16 g/100 mL, about 17 g/100 mL, about 18 g/100 mL, about 19 g/100 mL, or about 20 g/100 mL.

In some embodiments, the surface treatment is performed at room temperature. In some embodiments, the surface treatment is performed at an elevated above temperature but below the boiling point of the solvent. In some embodiments, the surface treatment is performed under an increased pressure and can be performed in a pressure vessel. These temperatures can be at room temperature or at a temperature up to the boiling point of the solvent at that pressure. In some embodiments, the surface treatment can be performed at about 30° C., about 40° C., about 50° C., about 60° C., about 70° C., about 80° C., about 90° C., about 100° C., about 110° C., about 120° C., about 130° C., about 140° C., about 150° C., about 160° C., about 170° C., about 180° C., about 190° C., or about 200° C., inclusive of all values and ranges therebetween. In some embodiments, the surface treatment can be performed at about 0.1 bar (gauge), about 0.3 bar, about 0.4 bar, about 0.5 bar, about 0.6 bar, about 0.7 bar, about 0.8 bar, about 0.9 bar, about 1 bar, about 1.5 bar, about 2 bar, about 2.5 bar, about 3 bar, about 3.5 bar, about 4 bar, about 4.5 bar, about 5 bar, about 5.5 bar, about 6 bar, about 6.5 bar, about 7 bar, about 7.5 bar, about 8 bar, about 8.5 bar, about 9 bar, about 9.5 bar, or about 10 bar, inclusive of all values and ranges therebetween.

In some embodiments, mechanical stirring or agitation at step 511 can be used to improve contact and process efficiency. In some embodiments, a washing operation follows to remove residual surface treatment solvent after surface treatment is complete. Step 512 includes filtering the electrode powder and decanting the waste liquid stream from the filtration. The filtration can produce a damp electrode powder.

Step 513 is optional and includes cleaning the decanted waste liquid stream. In some embodiments, step 513 can include any of the processing parameters of step 414, as described above with reference to FIG. 5A. Step 514 includes drying the filtered electrode powder to form a dried electrode powder. The drying can remove any residual liquid. In some embodiments, the dried electrode powder can be sieved. Step 515 is optional and includes applying the cleaned waste liquid stream to the surface treatment. In other words, the cleaned waste liquid can be added to the solvent used for the surface treatment at step 511.

Figure 7:
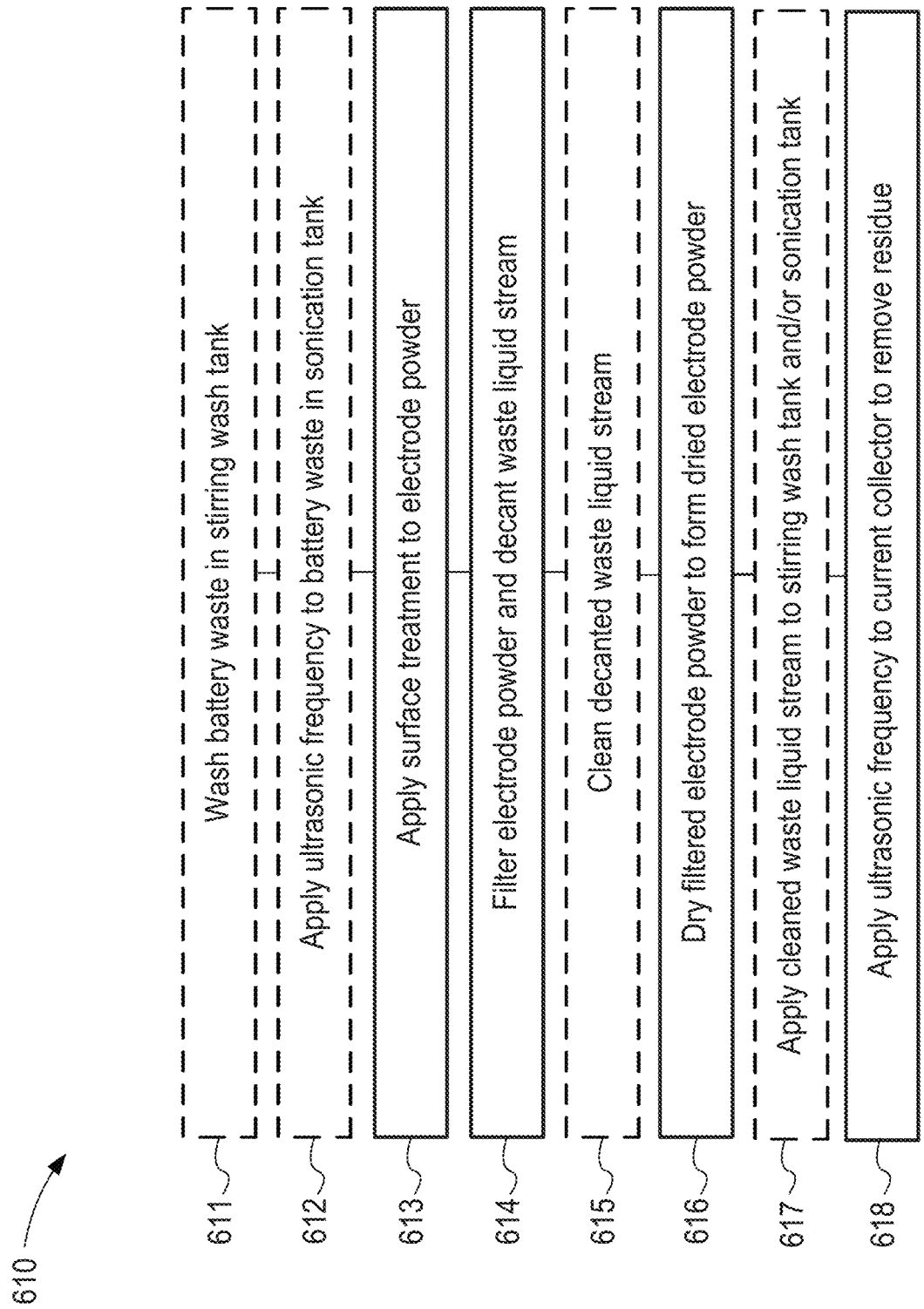
FIG. 7 is a flow diagram of a method of surface treatment of an electrode material, according to an embodiment.

FIG. 7 is a flow diagram of a method 610 of surface treatment of an electrode material, according to an embodiment. The method 610 can be employed for wet separation and surface treatment of electrode materials from current collectors. As shown, the method 610 optionally includes washing battery waste in a stirring wash tank at step 611 and applying an ultrasonic frequency to the battery waste in a sonication tank at step 612. The method 610 includes applying a surface treatment to the electrode powder at step 613, filtering the electrode powder and decanting a waste liquid stream at step 614, optionally cleaning the decanted waste liquid stream at step 615, drying the filtered electrode powder to form a dried electrode powder at step 616, optionally applying the waste liquid stream to stirring wash tank and/or the sonication tank at step 617, and optionally applying an ultrasonic frequency to the current collector to remove residue at step 618.

In some embodiments, the surface treatment can be performed in a controlled gas environment. In some embodiments, the gas environment can be inert. In some embodiments, the gas environment can include $N_2$ Ar, or other similar gas. In some embodiments, the gas environment can include $CO_2$. In some embodiments, the gas environment can be reducing. In some embodiments, the gas environment can include $H_2$, a mixture of Ar and $H_2$, a mixture of $N_2$ and $H_2$, or a mixture of $CO_2$ and CO. In some embodiments, the gas environment can include an oxidizing environment. An oxidizing environment can assist in the removal of organic compounds. In some embodiments, air or other aforementioned gas flows along or through the battery waste during the surface treatment. In some embodiments, no gas flows along or through the battery waste during the surface treatment.

In some embodiments, the gas environment can include about 0 vol %, about 1 vol %, about 2 vol %, about 3 vol %, about 4 vol %, about 5 vol %, about 6 vol %, about 7 vol %, about 8 vol %, about 9 vol %, about 10 vol %, about 12 vol %, about 13 vol %, about 14 vol %, about 15 vol %, about 16 vol %, about 17 vol %, about 18 vol %, about 19 vol %, about 20 vol %, about 21 vol %, about 22 vol %, about 23 vol %, about 24 vol %, or about 25 vol % $O_2$, inclusive of all values and ranges therebetween. In some embodiments, the gas environment can include an elevated amount of oxygen. In some embodiments, the gas environment can include pure oxygen or oxygen of a high purity. In some embodiments, the gas environment can include about 30 vol %, about 35 vol %, about 40 vol %, about 45 vol %, about 50 vol %, about 55 vol %, about 60 vol %, about 65 vol %, about 70 vol %, about 75 vol %, about 80 vol %, about 85 vol %, about 90 vol %, about 95 vol %, or about 100 vol % $O_2$, inclusive of all values and ranges therebetween.

In some embodiments, step 611 and step 612 can be performed at least partially concurrently to separate the electrode material from the current collector. The washing of the battery waste in the stirring wash tank and/or the application of the ultrasonic frequency to the battery waste in the sonication tank can occur at least partially concurrently. Step 611 and/or step 612 utilize liquid assistance to separate the electrode material from the current collector. After the electrode material separates from the current collector, the electrode material can be processed the same or substantially similar to the processing of the method 510, as described above with reference to FIG. 6.

Step 613 includes applying a surface treatment to the electrode powder. In some embodiments, step 613 can be the same or substantially similar to step 511, as described above with reference to FIG. 6. Step 614 includes filtering the electrode powder and decanting the waste liquid stream. In some embodiments, step 614 can be the same or substantially similar to step 512, as described above with reference to FIG. 6. Step 615 is optional and includes cleaning the decanted waste liquid stream. In some embodiments, step 615 can be the same or substantially similar to step 513, as described above with reference to FIG. 6. Step 616 includes drying the filtered electrode powder to form a dried electrode powder. In some embodiments, step 616 can be the same or substantially similar to step 514, as described above with reference to FIG. 6.

Step 617 is optional and includes applying the cleaned waste liquid stream to the stirring wash tank and/or the sonication tank. In some embodiments, step 617 can be the same or substantially similar to step 515, as described above with reference to FIG. 6. The cleaned waste liquid stream can provide a suitable solvent for stirring and/or sonication. Step 618 is optional and includes applying an ultrasonic frequency to the current collector to remove residue from the current collector. In some embodiments, step 618 can be the same or substantially similar to step 417, as described above with reference to FIG. 5A.

Figure 8:
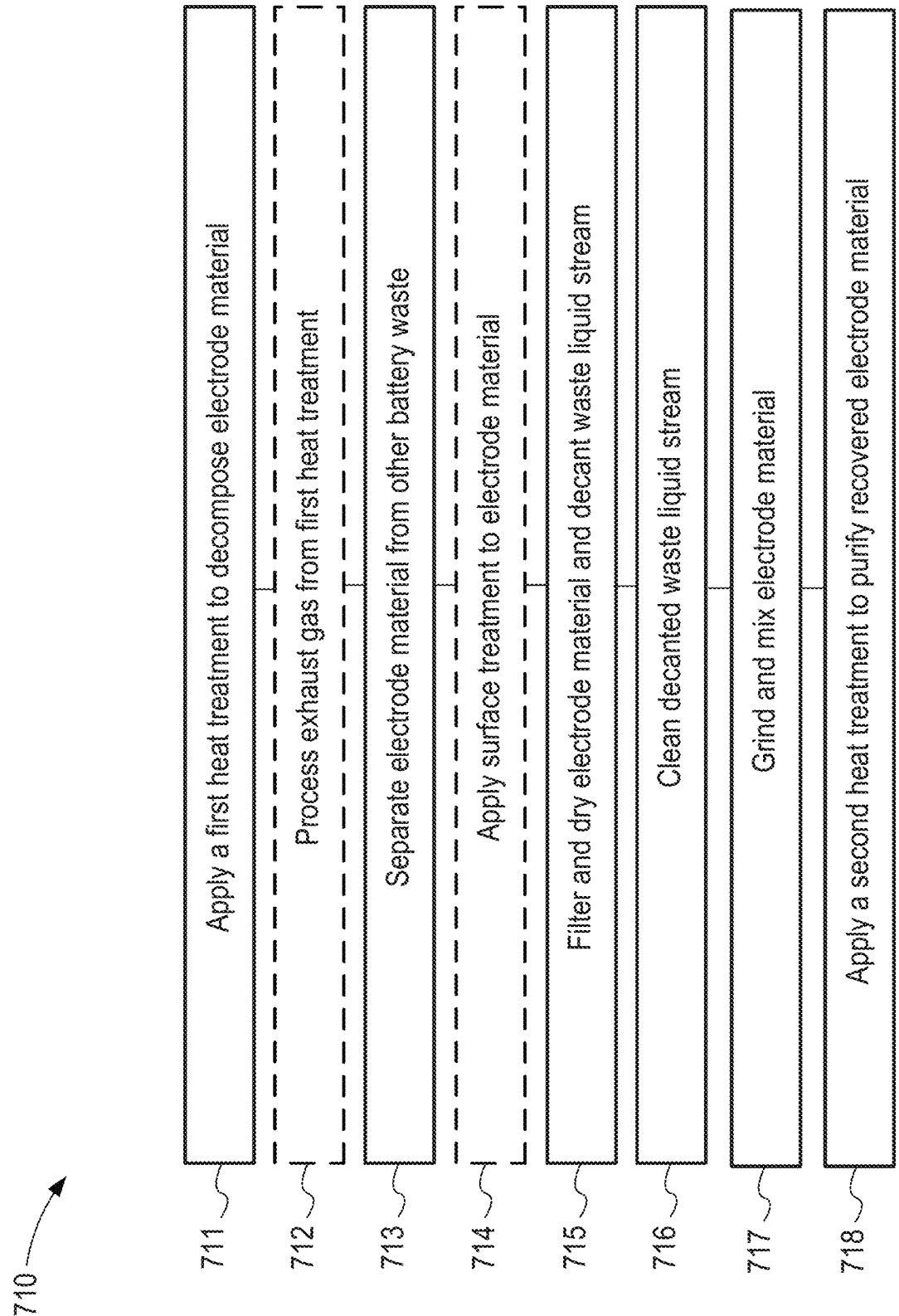
FIG. 8 is a flow diagram of a method of producing a recycled electrode material, according to an embodiment.

FIG. 8 is a flow diagram of a method 710 of producing a recycled electrode material, according to an embodiment. The method 710 can be used to recycle a wide variety of battery waste, as described above. In some embodiments, the battery waste comprises LCO, NCM waste cathode scrap, NCA waste cathode scrap, LFP waste cathode scrap, and/or LTO waste anode scrap. In some embodiments, the battery waste can include a cathode and/or anode material (with or without additives and/or binder) on a current collector. In some embodiments, the battery waste can include other battery components, such as packaging or a separator. In some embodiments, the battery waste can include electrolyte or lithium salts.

As shown, the method 710 includes applying a first heat treatment to decompose the electrode material at step 711, optionally processing exhaust gas from the first heat treatment at step 712, separating the electrode material from other battery waste at step 713, optionally applying a surface treatment to the electrode material at step 714, filtering and drying the electrode material and decanting the waste liquid stream at step 715, cleaning the decanted waste liquid stream at step 716, grinding and mixing the electrode material at step 717, and applying a second heat treatment to purify the recovered electrode material at step 718.

Step 711 includes applying a first heat treatment to decompose the electrode material. In some embodiments, the first heat treatment can partially or fully degrade battery waste components, such as binder, electrolyte, lithium salts, or packaging material. In some embodiments, step 711 can have any of the processing parameters as step 13, as described above with reference to FIG. 1. At step 712 exhaust gas from the first heat treatment is optionally processed. In some embodiments, the exhaust gas can be scrubbed, cleaned, and/or filtered to remove any hazardous or undesirable compounds (e.g., hydrogen fluoride, hydrofluorocarbons, fluorocarbons, and/or VOCs) to exhaust cleaner gas. In some embodiments, step 712 can have any of the processing parameters of step 14, as described above with reference to FIG. 1.

Step 713 includes separating the electrode material from other battery waste (e.g., current collectors, packaging, separators). In some embodiments, the separation of the electrode material from the other battery waste can include a dry separation method, including rotary sieving, shaking, sonication sieving, and/or air jet sieving. In some embodiments, the separation of the electrode material from the other battery waste can include a wet separation method, including stirring washing and/or sonication. In some embodiments, step 713 can have any of the processing parameters of step 15, as described above with reference to FIG. 1.

Step 714 is optional and includes applying a surface treatment to the electrode material. The surface treatment modifies the surface properties of the electrode material. In some embodiments, step 714 can have any of the processing parameters of step 17, as described above with reference to FIG. 1. Step 715 includes filtering and drying the electrode material and decanting the waste liquid stream. In some embodiments, step 715 can include any of the processing parameters of step 614 and step 616, as described above with reference Step 716 includes cleaning the decanted waste liquid stream. In some embodiments, the waste liquid stream can include an aqueous solution. In some embodiments, the aqueous solution can be neutralized and precipitated to create a clean water stream. In some embodiments, step 716 can include any of the processing parameters of step 513, as described above with reference to FIG. 6. Step 717 includes grinding and mixing the electrode material. In some embodiments, the electrode material can be grinded and mixed after the surface treatment at step 714. In some embodiments, a pre-determined amount of a lithium source can be mixed with the electrode material if it is determined to be lithium deficient. In some embodiments, an extra wash process can be applied to remove excess lithium from the electrode material.

Step 718 includes applying a second heat treatment to purify the recovered electrode material. In some embodiments, step 718 can produce commercial-grade recycled electrode powder. In some embodiments, the second heat treatment can be performed at a temperature of at least about 500° C., at least about 510° C., at least about 520° C., at least about 530° C., at least about 540° C., at least about 550° C., at least about 560° C., at least about 570° C., at least about 580° C., at least about 590° C., at least about 600° C., at least about 610° C., at least about 620° C., at least about 630° C., at least about 640° C., at least about 650° C., at least about 660° C., at least about 670° C., at least about 680° C., or at least about 690° C. In some embodiments, the second heat treatment can be performed at a temperature of no more than about 700° C., no more than about 690° C., no more than about 680° C., no more than about 670° C., no more than about 660° C., no more than about 650° C., no more than about 640° C., no more than about 630° C., no more than about 620° C., no more than about 610° C., no more than about 600° C., no more than about 590° C., no more than about 580° C., no more than about 570° C., no more than about 560° C., no more than about 550° C., no more than about 540° C., no more than about 530° C., no more than about 520° C., or no more than about 510° C. Combinations of the above-referenced temperatures are also possible (e.g., at least about 500° C. and no more than about 700° C. or at least about 550° C. and no more than about 650° C.), inclusive of all values and ranges therebetween. In some embodiments, the second heat treatment can be performed at a temperature of about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., about 690° C., or about 700° C.

In some embodiments, the recovered electrode material from the second heat treatment can include LFP. In some embodiments, the second heat treatment can be performed in an inert environment (e.g., including nitrogen gas). In some embodiments, the second heat treatment can have a duration of at least about 3 hours, at least about 3.5 hours, at least about 4 hours, at least about 4.5 hours, at least about 5 hours, or at least about 5.5 hours. In some embodiments, the second heat treatment can have a duration of no more than about 6 hours, no more than about 5.5 hours, no more than about 5 hours, no more than about 4.5 hours, no more than about 4 hours, or no more than about 3.5 hours. Combinations of the above-referenced durations are also possible (e.g., at least about 3 hours and no more than about 6 hours or at least about 3.5 hours and no more than about 5.5 hours), inclusive of all values and ranges therebetween. In some embodiments, the second heat treatment can have a duration of about 3 hours, about 3.5 hours, about 4 hours, about 4.5 hours, about 5 hours, about 5.5 hours, or about 6 hours.

In some embodiments, electrode materials containing nickel or cobalt (such as LCO or NCM) can be processed through the second heat treatment operation at a temperature of at least about 700° C., at least about 750° C., at least about 800° C., at least about 850° C., at least about 900° C., or at least about 950° C. In some embodiments, the second heat treatment operation can be conducted at a temperature of no more than about 1,000° C., no more than about 950° C., no more than about 900° C., no more than about 850° C., no more than about 800° C., or no more than about 750° C. Combinations of the above-referenced temperatures are also possible (e.g., at least about 700° C. and no more than about 1,000° C. or at least about 800° C. and no more than about 900° C.), inclusive of all values and ranges therebetween. In some embodiments, the second heat treatment operation can be conducted at a temperature of about 700° C., about 750° C., about 800° C., about 850° C., about 900° C., about 950° C., or about 1,000° C. In some embodiments, the second heat treatment operation can be conducted in air or an elevated oxygen environment.

In some embodiments, the second heat treatment can have a duration of at least about 8 hours, at least about 8.5 hours, at least about 9 hours, at least about 9.5 hours, at least about 10 hours, at least about 10.5 hours, at least about 11 hours, at least about 11.5 hours, at least about 12 hours, at least about 12.5 hours, at least about 13 hours, at least about 13.5 hours, at least about 14 hours, or at least about 14.5 hours. In some embodiments, the second heat treatment can have a duration of no more than about 15 hours, no more than about 14.5 hours, no more than about 14 hours, no more than about 13.5 hours, no more than about 13 hours, no more than about 12.5 hours, no more than about 12 hours, no more than about 11.5 hours, no more than about 11 hours, no more than about 10.5 hours, no more than about 10 hours, no more than about 9.5 hours, no more than about 9 hours, or no more than about 8.5 hours. Combinations of the above-referenced durations for the second heat treatment time are also possible (e.g., at least about 8 hours and no more than about 15 hours or at least about 10 hours and no more than about 12 hours), inclusive of all values and ranges therebetween. In some embodiments, the second heat treatment can have a duration of about 8 hours, about 8.5 hours, about 9 hours, about 9.5 hours, about 10 hours, about 10.5 hours, about 11 hours, about 11.5 hours, about 12 hours, about 12.5 hours, about 13 hours, about 13.5 hours, about 14 hours, about 14.5 hours, or about 15 hours.

Figure 9:
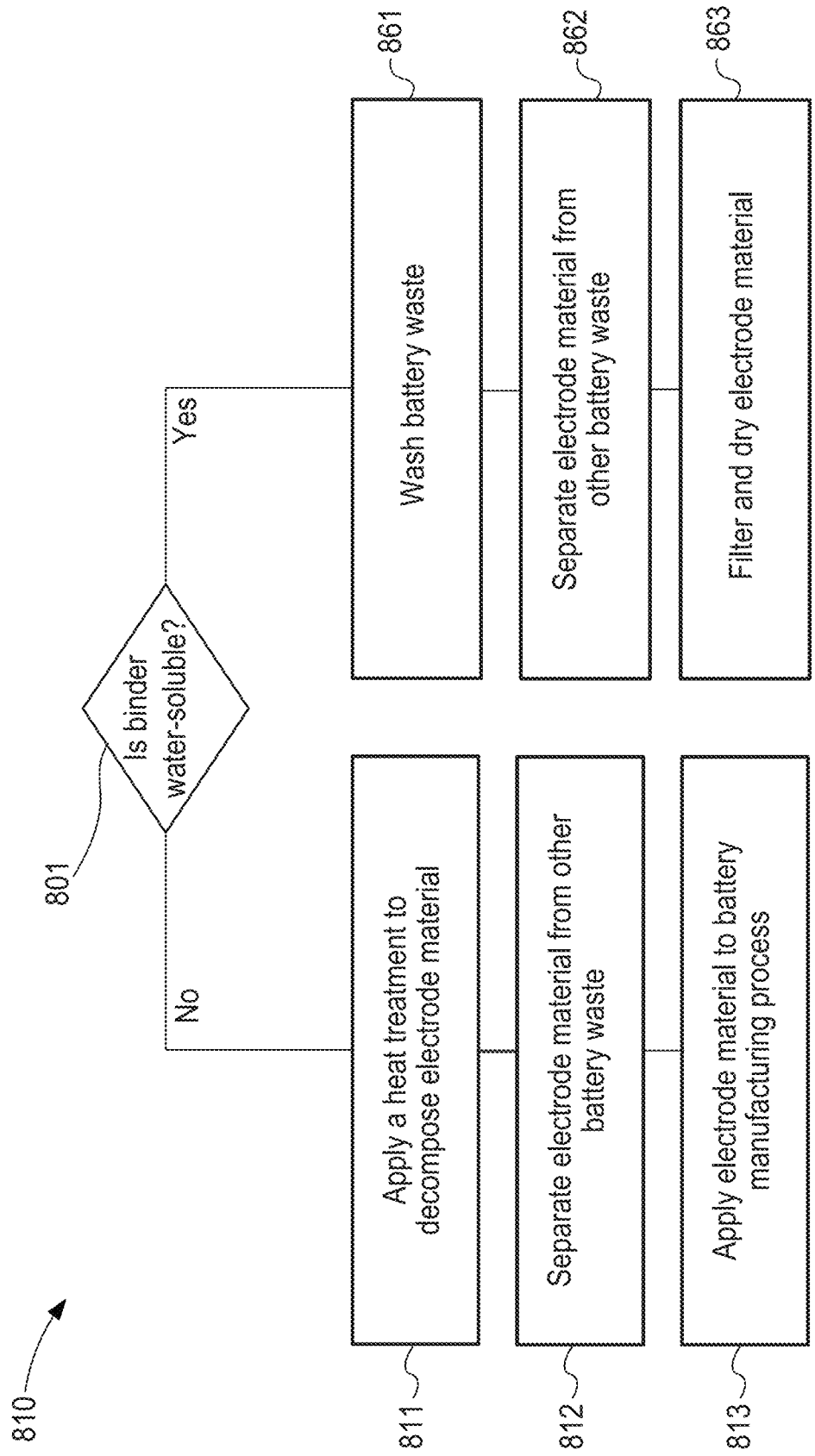
FIG. 9 is a decision flow chart of a method of processing electrode material, according to an embodiment.

FIG. 9 is a decision flow chart of a method 810 of processing electrode material, according to an embodiment. In some embodiments, the method 810 can be used for direct recycling of battery waste. In some embodiments, the method 810 can be used to recycle battery waste containing graphite waste anode.

As shown, the method 810 includes determining whether the electrode binder is water-soluble at step 801. If not, the method 810 proceeds to applying a heat treatment to decompose the electrode material at step 811, separating the electrode material from other battery waste at step 812, and applying the electrode material to a battery manufacturing process at step 813. If the binder is water soluble, the method 810 proceeds to washing the battery waste and the electrode material at step 861, separating the electrode material from the other battery waste at step 862, and filtering and drying the electrode material at step 863.

Step 801 includes determining if the battery waste or a subset of the battery waste is water soluble. In some embodiments, the battery waste or a subset thereof can undergo a dissolution test in water to determine whether water-soluble binder or water-insoluble binder is present. In some embodiments, the type of binder is known beforehand. In some embodiments, the battery waste is tested using an assay, spectroscopy, spectrometry, or other similar test to determine whether water-soluble or water-insoluble binder is present. In some embodiments, the test can be gas chromatography, mass spectrometry, Raman spectroscopy, Fourier-transform infrared spectroscopy, energy-dispersive X-ray spectroscopy, or other similar tests or combinations thereof.

If the binder is water soluble, step 861 includes washing the battery waste including the electrode material. In some embodiments, the washing can be via an aqueous solvent (e.g., water). In some embodiments, step 861 can have any of the processing parameters of step 611, as described above with reference to FIG. 7. Step 862 includes separating the electrode material from the other battery waste. In some embodiments, step 862 can include any of the processing parameters of step 713, as described above with reference to FIG. 8. Step 863 includes filtering and drying the electrode material. In some embodiments, step 863 can include any of the processing parameters of step 715, as described above with reference to FIG. 8. The filtration and drying can produce electrode materials, such as a graphite electrode material. In some embodiments, the electrode material can additionally undergo a surface treatment operation to modify the surface of the electrode material. In some embodiments, the surface treatment operation can have any of the properties of step 714, as described above with reference to FIG. 8. In some embodiments, the electrode material can additionally undergo a heat treatment operation to regenerate the electrode material. In some embodiments, the heat treatment operation can have any of the properties of the first heat treatment operation at step 13 and/or the second heat treatment operation at step 18, as described above with reference to FIG. 1.

For battery waste with water-insoluble binder, the method 810 includes applying a heat treatment to decompose the electrode material at step 811. The heat treatment can partially or entirely remove or degrade water-insoluble binder (e.g., PVDF). In some embodiments, the battery waste is heat treated to a temperature of at least about 400° C., at least about 450° C., at least about 500° C., or at least about 550° C. In some embodiments, the battery waste is heat treated at a temperature of no more than about 600° C., no more than about 550° C., no more than about 500° C., or no more than about 400° C. Combinations of the above-referenced temperatures of the battery waste heat treating are also possible (e.g., at least about 400° C. and no more than about 600° C. or at least about 450° C. and no more than about 550° C.), inclusive of all values and ranges therebetween. In some embodiments, the battery waste is heat treated at a temperature of about 400° C., about 450° C., about 500° C., about 550° C., or about 600° C. In some embodiments, the heat treatment is performed under inert gas, as described above. In some embodiments, the waste gas generated in the heat treatment is scrubbed, washed, cleaned, and/or filtered to remove any hazardous or undesirable compounds (e.g., hydrogen fluoride).

Step 812 includes separating the electrode material from the other battery waste. In some embodiments, the separation operation uses dry methods, such as rotary sieving, shaking and sonication sieving, and air jet sieving, to separate the current collectors or other battery waste components from the electrode powder (which can include additives that can still be present in the electrode powder). Step 812 can include separating the electrode material from the current collector. In some embodiments, the current collector can include a copper sheet and the electrode material can include graphite. The separated electrode material is collected (e.g., in the form of a powder) as the output in this recycling process. In some embodiments, the separation of the electrode material from the other battery waste can have any of the process parameters of step 713, as described above with reference to FIG. 8.

In some embodiments, the electrode material can additionally undergo a surface treatment operation to modify the surface of the electrode material. In some embodiments, the electrode material can additionally undergo a heat treatment operation to regenerate the electrode material. These surface treatment and/or heat treatment processes can include any of the process parameters of the surface treatment processes and/or heat treatment processes described above.

Figure 10:
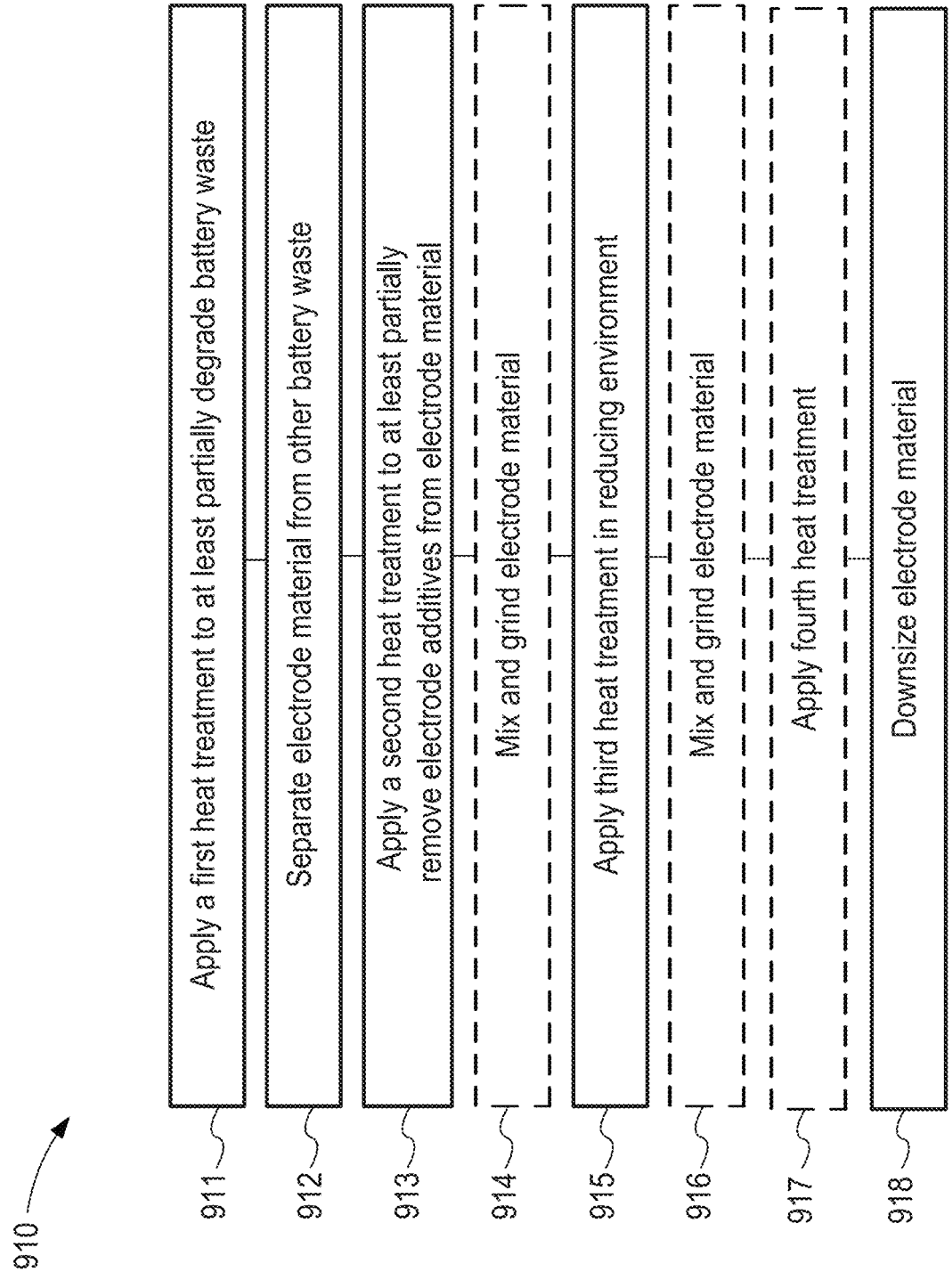
FIG. 10 is a flow diagram of a method of recycling battery waste, according to an embodiment.

FIG. 10 is a flow diagram of a method 910 of recycling battery waste, according to an embodiment. In some embodiments, the method 910 can be employed in a system or a facility. In some embodiments, the method 910 can be employed to recycle $Li_xM_yPO_4$ electrode materials, where M is at least one transition metal and x and y are integers. In some embodiments, the method 910 can be used to recycle LFMP or other similar LFP or LFMP compounds and/or derivatives thereof. In some embodiments, the battery waste can include a cathode material (with or without binder) on a current collector. In some embodiments, the battery waste can include other battery components, such as packaging or a separator. In some embodiments, the battery waste can include an anode. In some embodiments, the battery waste can include electrolytes and/or lithium salts. In some embodiments, the battery waste can include cathode additives such as conductive carbon.

As shown, the method 910 includes applying a first heat treatment to at least partially degrade the battery waste at step 911, separating an electrode material from other battery waste at step 912, and optionally applying a second heat treatment to at least partially remove electrode additives from the electrode material at step 913. The method 910 optionally includes mixing and grinding the electrode material at step 914. The method 910 further includes applying a third heat treatment in a reducing environment at step 915. The method 910 optionally includes mixing and grinding the electrode material at step 916 and applying a fourth heat treatment at step 917. The method 910 further includes downsizing the electrode material at step 918.

At step 911, the method 910 includes applying a first heat treatment to at least partially degrade the battery waste. The first heat treatment can partially or fully remove or downgrade battery waste components, such as binder, electrolytes, and lithium salts. The temperature of the first heat treatment can decompose and/or degrade at least a portion of the battery waste components. The decomposed and/or degraded portion of the battery waste components can then be removed (e.g., via vaporization). In some embodiments, the first heat treatment can be performed in an inert gas environment. In some embodiments, the first heat treatment can be performed in a reducing gas environment. In some embodiments, the gas environment can include gases such as $CO_2$, CO, $N_2$, Ar, $H_2$, or a mixture thereof. In some embodiments, the first heat treatment can be performed in an oxidizing gas environment. In some embodiments, the first heat treatment can be performed in air. In some embodiments, the first heat treatment can be performed in an elevated oxygen environment (e.g., at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, or at least about 95 vol % oxygen, inclusive of all values and ranges therebetween). In some embodiments, the first heat treatment can be performed in a pure oxygen environment. In some embodiments, the first heat treatment can be performed in an environment with at least about 96 vol %, at least about 97 vol %, at least about 98 vol %, at least about 99 vol %, at least about 99 vol %, at least about 99.9 vol %, at least about 99.99 vol %, or at least about 99.999 vol % oxygen.

In some embodiments, the first heat treatment can be at a temperature of at least about 300° C., at least about 350° C., at least about 400° C., at least about 450° C., at least about 500° C., or at least about 550° C., at least about 600° C., at least about 650° C., at least about 700° C., at least about 750° C., at least about 800° C., at least about 850° C., at least about 900° C., at least about 950° C., at least about 1,000° C., at least about 1,050° C., or at least about 1,100° C. In some embodiments, the first heat treatment can be at a temperature of no more than about 1,150° C., no more than about 1,100° C., no more than about 1,050° C., no more than about 1,000° C., no more than about 950° C., no more than about 900° C., no more than about 850° C., no more than about 800° C., no more than about 750° C., no more than about 700° C., no more than about 650° C., no more than about 600° C., no more than about 550° C., no more than about 500° C., no more than about 450° C., no more than about 400° C., or no more than about 350° C. Combinations of the above-referenced temperatures are also possible (e.g., at least about 300° C. and no more than about 1,150° C. or at least about 500° C. and no more than about 800° C.), inclusive of all values and ranges therebetween. In some embodiments, the first heat treatment can be at a temperature of about 300° C., about 350° C., about 400° C., about 450° C., about 500° C., about 550° C., about 600° C., about 650° C., about 700° C., about 750° C., about 800° C., about 850° C., about 900° C., about 950° C., about 1,000° C., about 1,050° C., about 1,100° C., or about 1,150° C.

In some embodiments, the first heat treatment can have a duration of at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours, at least about 13 hours, at least about 14 hours, or at least about 15 hours. In some embodiments, the first heat treatment can have a duration of no more than about 16 hours, no more than about 15 hours, no more than about 14 hours, no more than about 13 hours, no more than about 12 hours, no more than about 11 hours, no more than about 10 hours, no more than about 9 hours, no more than about 8 hours, no more than about 7 hours, no more than about 6 hours, no more than about 5 hours, no more than about 4 hours, no more than about 3 hours, or no more than about 2 hours. Combinations of the above-referenced durations of the first heat treatment are also possible (e.g., at least about 1 hour and no more than about 16 hours or at least about 4 hours and no more than about 8 hours), inclusive of all values and ranges therebetween. In some embodiments, the first heat treatment can have a duration of about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, or about 16 hours.

Step 912 includes separating the electrode material from other battery waste components. In some embodiments, the other battery waste components can include current collectors and/or separators. In some embodiments, the electrode material can include an electrode powder. In some embodiments, the separation can be via a dry separation method. In some embodiments, the separation can be via rotary sieving, shaking, sonication sieveing, air jet sieveing, or any combination thereof. In some embodiments, the separation can include a wet separation method. In some embodiments, the separation can include stirring washing, sonication, or any combination thereof.

Step 913 is optional and includes a second heat treatment to at least partially remove electrode additives from the electrode material. In some embodiments, the second heat treatment can be composed in an oxidizing gas environment to decompose and/or degrade battery waste components such as binder, electrolytes, lithium salts, anode, and/or electrode additives. In some embodiments, the second heat treatment can be performed in air. In some embodiments, the second heat treatment can be performed in an elevated oxygen environment (e.g., at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, or at least about 95 vol % oxygen, inclusive of all values and ranges therebetween). In some embodiments, the second heat treatment can be performed in a pure oxygen environment. In some embodiments, the second heat treatment can be performed in an environment with at least about 96 vol %, at least about 97 vol %, at least about 98 vol %, at least about 99 vol %, at least about 99 vol %, at least about 99.9 vol %, at least about 99.99 vol %, or at least about 99.999 vol % oxygen.

In some embodiments, the second heat treatment can partially or fully remove additives from the electrode, including conductive carbon. In some embodiments, the second heat treatment can partially or fully remove anode graphite from the electrode material. In some embodiments, the conductive carbon and/or the graphite in the battery waste can be partially or fully oxidized and generate CO or $CO_2$ during the second heat treatment. In some embodiments, the electrode material can be partially or fully oxidized after the second heat treatment. In some embodiments, LFP electrode materials can be partially or fully oxidized during the second heat treatment and can generate an oxidized cathode product. In some embodiments, the oxidized cathode product can include $Fe_2O_3$, $Fe_3O_4$, $Li_3Fe_2(PO_4)_3$, $LiFeP_2O_7$, $FePO_4$, $Li_3PO_4$, $Li_2CO_3$, LiOH, or any combination thereof.

In some embodiments, the second heat treatment can be at a temperature of at least about 300° C., at least about 350° C., at least about 400° C., at least about 450° C., at least about 500° C., or at least about 550° C., at least about 600° C., at least about 650° C., at least about 700° C., at least about 750° C., at least about 800° C., at least about 850° C., at least about 900° C., at least about 950° C., at least about 1,000° C., at least about 1,050° C., or at least about 1,100° C. In some embodiments, the second heat treatment can be at a temperature of no more than about 1,150° C., no more than about 1,100° C., no more than about 1,050° C., no more than about 1,000° C., no more than about 950° C., no more than about 900° C., no more than about 850° C., no more than about 800° C., no more than about 750° C., no more than about 700° C., no more than about 650° C., no more than about 600° C., no more than about 550° C., no more than about 500° C., no more than about 450° C., no more than about 400° C., or no more than about 350° C. Combinations of the above-referenced temperatures are also possible (e.g., at least about 300° C. and no more than about 1,150° C. or at least about 500° C. and no more than about 800° C.), inclusive of all values and ranges therebetween. In some embodiments, the second heat treatment can be at a temperature of about 300° C., about 350° C., about 400° C., about 450° C., about 500° C., about 550° C., about 600° C., about 650° C., about 700° C., about 750° C., about 800° C., about 850° C., about 900° C., about 950° C., about 1,000° C., about 1,050° C., about 1,100° C., or about 1,150° C.

In some embodiments, the second heat treatment can have a duration of at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours, at least about 13 hours, at least about 14 hours, or at least about 15 hours. In some embodiments, the second heat treatment can have a duration of no more than about 16 hours, no more than about 15 hours, no more than about 14 hours, no more than about 13 hours, no more than about 12 hours, no more than about 11 hours, no more than about 10 hours, no more than about 9 hours, no more than about 8 hours, no more than about 7 hours, no more than about 6 hours, no more than about 5 hours, no more than about 4 hours, no more than about 3 hours, or no more than about 2 hours. Combinations of the above-referenced durations of the first heat treatment are also possible (e.g., at least about 1 hour and no more than about 16 hours or at least about 4 hours and no more than about 8 hours), inclusive of all values and ranges therebetween. In some embodiments, the second heat treatment can have a duration of about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, or about 16 hours.

In some embodiments, the second heat treatment can partially or fully oxidize any additional materials or impurities in the battery waste. In some embodiments, aluminum in the battery waste can be partially or fully oxidized. In some embodiments, copper in the battery waste can be partially or fully oxidized. In some embodiments, iron in the battery waste can be partially or fully oxidized, in some embodiments, the oxidation of impurities, such as Al, Cu, or Fe, can improve the performance of the final recovered cathode product, reduce or eliminate any impurities that are conductive from shorting or otherwise causing damage to a battery, and/or promote the further removal of the impurities.

In some embodiments, the first heat treatment of step 911 and the second heat treatment of step 913 can be combined into a single heat treatment before the separation at step 912. This single heat treatment can partially or fully decompose and/or degrade some battery waste components, such as binders, electrolytes, lithium salts, anode materials, and/or conductive carbon. In some embodiments, the first heat treatment of step 911 and/or the second heat treatment of step 913 can partially or fully oxidize the cathode materials.

In some embodiments, waste gas generated during the first heat treatment and/or the second heat treatment can be scrubbed, cleaned, and/or filtered to remove any hazardous or undesired compounds (e.g., hydrogen fluoride, hydrofluorocarbons, fluorocarbons, and/or volatile organic compounds (VOC's)) to exhaust cleaner gas, as described above in steps 14 and 18, with respect to FIG. 1.

In some embodiments, the electrode material can undergo additional reduction and regeneration to generate a commercially usable recovered material. In some embodiments, the oxidized cathode product can undergo a further reduction and regeneration to form a commercially usable recovered material. At step 914, the electrode material is optionally subject to a mixing and grinding process. In some embodiments, additives such as a lithium source (e.g., $Li_2CO_3$, LiOH) and/or reducing agents (e.g., carbon or organic compounds such as glucose, graphite, or starch) can be added cluing step 914 to facilitate the mixing and grinding. In some embodiments, the addition of glucose, graphite, or starch during heat treatment can be used to partially or fully decompose the glucose, graphite, or starch to form a carbon coating on the cathode, which can lead to improved electrochemical performance. In some embodiments, the mixing and grinding can be performed via wet mixing with equipment such as a nano bead mill, a planetary ball mill, a roller jar mill, or any combination thereof.

In some embodiments, the size and morphology of the electrode material can be controlled during the mixing and grinding of step 914. In some embodiments, the grinding media can have a size of at least about 0.01 mm, at least about 0.05 mm, at least about 0.1 mm, at least about 0.5 mm, at least about 1 mm, at least about 5 mm, at least about 10 mm, or at least about 50 mm. In some embodiments, the grinding media can have a size of no more than about 100 mm, no more than about 50 mm, no more than about 10 mm, no more than about 5 mm, no more than about 1 mm, no more than about 0.5 mm, no more than about 0.1 mm, or no more than about 0.05 mm. Combinations of the above-referenced grinding media sizes are also possible (e.g., at least about 0.01 mm and no more than about 100 mm or at least about 0.01 mm and no more than about 0.1 mm or at least about 0.1 mm and no more than about 1 mm or at least about 1 mm and no more than about 10 mm or at least about 10 mm and no more than about 100 mm), inclusive of all values and ranges therebetween. In some embodiments, the grinding media can have a size of about 0.01 mm, about 0.05 mm, about 0.1 mm, about 0.5 mm, about 1 mm, about 5 mm, about 10 mm, about 50 mm, or about 100 mm.

In some embodiments, the grinding and mixing at step 914 can be for a duration of at least about 30 seconds, at least about 36 seconds, at least about 1 minute, at least about 6 minutes, at least about 1 hour, at least about 2 hours, at least about 3 hours, at least about 4 hours, at least about 5 hours, at least about 6 hours, at least about 7 hours, at least about 9 hours, at least about 10 hours, at least about 20 hours, at least about 30 hours, at least about 40 hours, at least about 50 hours, at least about 60 hours, at least about 70 hours, at least about 80 hours, or at least about 90 hours. In some embodiments, the grinding and mixing at step 914 can be for a duration of no more than about 100 hours, no more than about 90 hours, no more than about 80 hours, no more than about 70 hours, no more than about 60 hours, no more than about 50 hours, no more than about 40 hours, no more than about 30 hours, no more than about 20 hours, no more than about 10 hours, no more than about 9 hours, no more than about 8 hours, no more than about 7 hours, no more than about 6 hours, no more than about 5 hours, no more than about 4 hours, no more than about 3 hours, no more than about 2 hours, no more than about 1 hour, no more than about 30 minutes, no more than about 6 minutes, or no more than about 36 seconds. Combinations of the above-referenced durations are also possible (e.g., at least about 30 seconds and no more than about 100 hours or at least about 5 hours and no more than about 50 hours), inclusive of all values and ranges therebetween. In some embodiments, the grinding and mixing at step 914 can be for a duration of about 30 seconds, about 36 seconds, about 1 minute, about 6 minutes, about 30 minutes, about hour, about 2 hours, about 3 hours, about 4 hours, about 5 hours, about 6 hours, about 7 hours, about 9 hours, about 10 hours, about 20 hours, about 30 hours, about 40 hours, about 50 hours, about 60 hours, about 70 hours, about 80 hours, about 90 hours, or about 100 hours.

In some embodiments, the rotary speed for the mixing and grinding process at step 914 can be at least about 0 rpm, at least about 1 rpm, at least about 5 rpm, at least about 10 rpm, at least about 100 rpm, at least about 500 rpm, at least about 1,000 rpm, at least about 2,000 rpm, at least about 5,000 rpm, at least about 10,000 rpm, or at least about 20,000 rpm. In some embodiments, the rotary speed for the mixing and grinding process at step 914 can be no more than about 50,000 rpm, no more than about 20,000 rpm, no more than about 10,000 rpm, no more than about 5,000 rpm, no more than about 2,001) rpm, no more than about 1,000 rpm, no more than about 5,000 rpm, no more than about 1,000 rpm, no more than about 500 rpm, no more than about 100 rpm, no more than about 10 rpm, no more than about 0.5 rpm, or no more than about 1 rpm. Combinations of the above-referenced rotary speeds are also possible (e.g., at least about 0 rpm and no more than about 50,000 rpm or at least about 100 rpm and no more than about 10,001) rpm), inclusive of all values and ranges therebetween. In some embodiments, the rotary speed for the mixing and grinding process at step 914 can be about 0 rpm, about 1 rpm, about 0.5 rpm, about 10 rpm, about 100 rpm, about 500 rpm, about 1,000 rpm, about 2,000 rpm, about 5,000 rpm, about 10,000 rpm, or about 20,000 rpm. In some embodiments, the rotary speed for the mixing and grinding process can be about 0 rpm to about 100 rpm, about 100 rpm to about 500 rpm, about 500 rpm to about 1,000 rpm, about 1,000 rpm to about 2,000 rpm, about 2,000 rpm to about 5,000 rpm, about 5,000 rpm to about 10,000 rpm, about 10,000 rpm to about 20,000 rpm and about 20,000 rpm to 50,000 rpm.

In some embodiments, dispensers such as water, ethanol or other organic solvents can be added to improve the performance of the mixing. In some embodiments, the drying process after the wet mixing can be performed with equipment such as a spray dryer, a stir dryer, a conical dryer, a vacuum rotary dryer, a drum scraper dryer, a flash dryer, or any combination thereof. In some embodiments, the morphology and particle size of the electrode material can be controlled by adjusting the feeding speed and/or drying temperature during the mixing process. In some embodiments, the morphology and particle size of the electrode material can be controlled by adjusting the feeding speed and/or drying temperature after the mixing process. In some embodiments, the mixing and grinding of step 914 can be performed via dry mixing with equipment such as an air jet mill, a high-speed mixer, a ball mill, or any combination thereof.

Step 915 includes applying a third heat treatment to the electrode material in a reducing environment. In some embodiments, the third heat treatment can form olivine $FePO_4$ (or other derivatives, such as $MPO_4$, where M is at least one transition metal) and lithium salts. In some embodiments, pre-determined amounts of a lithium source can be mixed with the electrode material (e.g., an oxidized cathode product) during the third heat treatment if the electrode material is lithium deficient. In some embodiments, the third heat treatment can be performed in an inert environment. In some embodiments, the third heat treatment can be performed in an inert or reducing gas environment to reduce the oxidized cathode product. In some embodiments, the reducing agent added can equal or exceed the stoichiometric amount to fully reduce the electrode material. In some embodiments, the reducing agent can include glucose. In some embodiments, the third heat treatment can finally reduce the iron to form a reduced iron compound.

In some embodiments, the third heat treatment can be at a temperature of at least about 300° C., at least about 350° C., at least about 400° C., at least about 450° C., at least about 500° C., or at least about 550° C., at least about 600° C., at least about 650° C., at least about 700° C., at least about 750° C., at least about 800° C., at least about 850° C., at least about 900° C., at least about 950° C., at least about 1,000° C., at least about 1,050° C., or at least about 1,100° C. In some embodiments, the third heat treatment can be at a temperature of no more than about 1,150° C., no more than about 1,100° C., no more than about 1,050° C., no more than about 1,000° C., no more than about 950° C., no more than about 900° C., no more than about 850° C., no more than about 800° C., no more than about 750° C., no more than about 700° C., no more than about 650° C., no more than about 600° C., no more than about 550° C., no more than about 500° C., no more than about 450° C., no more than about 400° C., or no more than about 350° C. Combinations of the above-referenced temperatures are also possible (e.g., at least about 300° C. and no more than about 1,150° C. or at least about 500° C. and no more than about 800° C.), inclusive of all values and ranges therebetween. In some embodiments, the third heat treatment can be at a temperature of about 300° C., about 350° C., about 400° C., about 450° C., about 500° C., about 550° C., about 600° C., about 650° C., about 700° C., about 750° C., about 800° C., about 850° C., about 900° C., about 950° C., about 1,000° C., about 1,050° C., about 1,100° C., or about 1,150° C.

In some embodiments, the third heat treatment can have a duration of at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours, at least about 13 hours, at least about 14 hours, or at least about 15 hours. In some embodiments, the third heat treatment can have a duration of no more than about 16 hours, no more than about 15 hours, no more than about 14 hours, no more than about 13 hours, no more than about 12 hours, no more than about 11 hours, no more than about 10 hours, no more than about 9 hours, no more than about 8 hours, no more than about 7 hours, no more than about 6 hours, no more than about 5 hours, no more than about 4 hours, no more than about 3 hours, or no more than about 2 hours. Combinations of the above-referenced durations of the first heat treatment are also possible (e.g., at least about 1 hour and no more than about 16 hours or at least about 4 hours and no more than about 8 hours), inclusive of all values and ranges therebetween. In some embodiments, the third heat treatment can have a duration of about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, or about 16 hours.

Step 916 is optional and includes mixing and grinding the electrode material. In some embodiments, step 916 can include any of the processing parameters of step 914 as described above. Thus, certain aspects of step 916 are not described in greater detail herein.

Step 917 is optional and includes a fourth heat treatment. In some embodiments, the fourth heat treatment can fully reduce iron (or other corresponding elements in $MPO_4$) to form olivine $LiFePO_4$ (or other LFP derivatives such as LFMP). In some embodiments, the fourth heat treatment can have any of the same parameters as the third heat treatment, as described above with reference to step 915. In some embodiments, the fourth heat treatment can be performed in an inert or reducing gas environment to reduce the oxidized cathode product. In some embodiments, the fourth heat treatment can form olivine $LiFePO_4$ (or other derivatives, such as LFMP). In some embodiments, the fourth heat treatment can be performed in an inert or reducing environment. In some embodiments, the third heat treatment of step 915 and the fourth heat treatment of step 917 can be combined into a single heat treatment step.

In some embodiments, the fourth heat treatment can be at a temperature of at least about 300° C., at least about 350° C., at least about 400° C., at least about 450° C., at least about 500° C., or at least about 550° C., at least about 600° C., at least about 650° C., at least about 700° C., at least about 750° C., at least about 800° C., at least about 850° C., at least about 900° C., at least about 950° C., at least about 1,000° C., at least about 1,050° C., or at least about 1,100° C. In some embodiments, the fourth heat treatment can be at a temperature of no more than about 1,150° C., no more than about 1,100° C., no more than about 1,050° C., no more than about 1,000° C., no more than about 950° C., no more than about 900° C., no more than about 850° C., no more than about 800° C., no more than about 750° C., no more than about 700° C., no more than about 650° C., no more than about 600° C., no more than about 550° C., no more than about 500° C., no more than about 450° C., no more than about 400° C., or no more than about 350° C. Combinations of the above-referenced temperatures are also possible (e.g., at least about 300° C. and no more than about 1,150° C. or at least about 500° C. and no more than about 800° C.), inclusive of all values and ranges therebetween. In some embodiments, the fourth heat treatment can be at a temperature of about 300° C., about 350° C., about 400° C., about 450° C., about 500° C., about 550° C., about 600° C., about 650° C., about 700° C., about 750° C., about 800° C., about 850° C., about 900° C., about 950° C., about 1,000° C., about 1,050° C., about 1,100° C., or about 1,150° C.

In some embodiments, the fourth heat treatment can have a duration of at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours, at least about 13 hours, at least about 14 hours, or at least about 15 hours. In some embodiments, the fourth heat treatment can have a duration of no more than about 16 hours, no more than about 15 hours, no more than about 14 hours, no more than about 13 hours, no more than about 12 hours, no more than about 11 hours, no more than about 10 hours, no more than about 9 hours, no more than about 8 hours, no more than about 7 hours, no more than about 6 hours, no more than about 5 hours, no more than about 4 hours, no more than about 3 hours, or no more than about 2 hours. Combinations of the above-referenced durations of the first heat treatment are also possible (e.g., at least about 1 hour and no more than about 16 hours or at least about 4 hours and no more than about 8 hours), inclusive of all values and ranges therebetween. In some embodiments, the fourth heat treatment can have a duration of about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, or about 16 hours.

Step 18 includes downsizing the electrode material. In some embodiments, the downsizing process can include grinding or milling. In some embodiments, the downsizing process can downsize the electrode material particles (e.g., LFP cathode materials) to a D50 value of less than about 100 less than about 75 μm, less than about 50 μm, less than about 25 μm, less than about 10 μm, less than about 5 μm, less than about 2 μm, less than about 1 μm, less than about 0.5 μm, less than about 0.2 μm, or less than about 0.1 μm. In some embodiments, the downsizing process can be performed via an air jet mill.

In some embodiments, the methods described herein can include other processes described herein. In some embodiments, methods described herein can include separation, purification, filtration, drying, washing, and surface treatment processes described herein. In some embodiments, the methods described herein can include at least one of a purification step (as described above), a filtration step (as described above), a drying step (as described above), and/or surface treatment step (as described above) after separation (e.g., step 15). In some embodiments, the methods described herein can include at least one of a purification step (as described above), a filtration step (as described above), a drying step (as described above), and/or surface treatment step (as described above) after the first heat treatment (e.g., step 13) and/or the second heat treatment (e.g., step 18). In some embodiments, the methods described herein can include at least one of a purification step (as described above), a filtration step (as described above), a drying step (as described above), and/or surface treatment step (as described above) after the mixing/grinding (e.g., at step 717).

EXAMPLES

Figure 11:
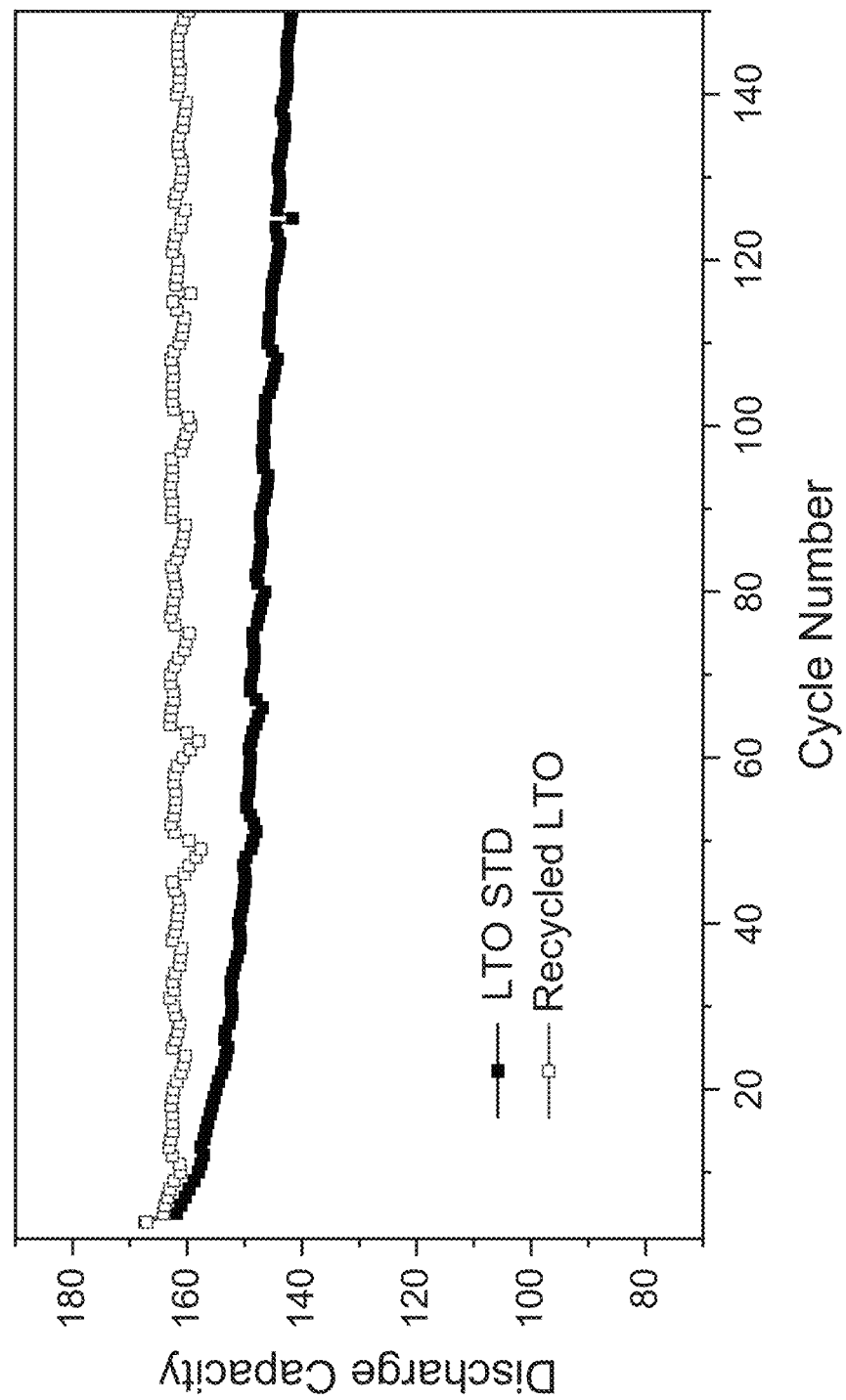
FIG. 11 shows the electrochemical performance of an electrode material lithium titanate (LTO) recovered by an embodiment of the invention compared to virgin commercial electrode material (standard or STD).

Example 1: The electrochemical performance of different electrode materials (LTO anode, NCM cathode and LFP cathode) recycled from the waste electrode scrap is compared to that of the virgin electrode materials (standard). The electrochemical performances are measured in CR-2032 type coin cells composed of a lithium metal electrode, a polypropylene separator, an electrode made from recycled or standard materials, and an electrolyte of 1 M LiPF6 in EC/DMC (3:7 by volume). The recycled or standard electrodes were prepared by mixing 80 weight percent (wt %) recycled powder with 10 wt % PVDF and 10 wt % conductive carbon. The coin cells were charged and discharged at a 1 C rate (n-C rate means the charge/discharge process finished in 1/n hours). FIG. 11 shows the cycling performance of the recycled LTO materials comparing to that of the standard LTO materials. The LTO materials were recycled from the waste LTO scrap by an embodiment of the direct recycling process similar to FIG. 8. No obvious capacity decay is observed over 150 cycles for the recycled LTO materials, while the standard LTO materials shows around 12% capacity decay.

Figure 12:
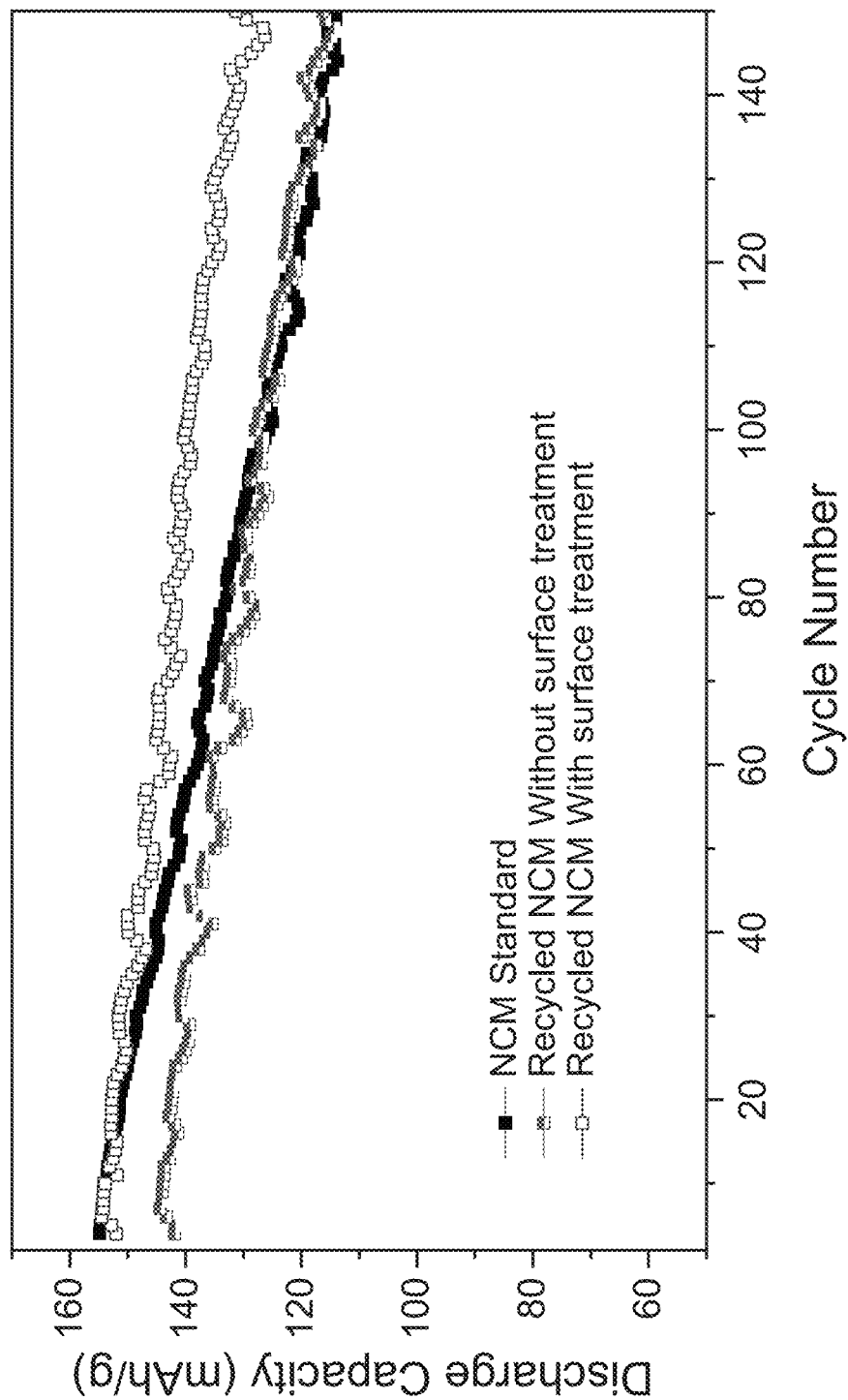
FIG. 12 shows the electrochemical performance of an electrode material lithium nickel cobalt manganese oxide (NCM) recovered by an embodiment of the invention compared to virgin commercial electrode material (standard or STD).

Example 2: FIG. 12 shows the cycling performance of the recycled NCM materials comparing to that of the standard NCM materials. The NCM materials were recycled from the waste NCM scrap by an embodiment of the direct recycling process similar to FIG. 9. The NCM materials were treated with 5 vol % acetic acid at room temperature for 20 min. The solid loading was 10 g/100 ml. Comparing to the standard NCM materials, the recycled NCM without surface treatment shows slightly lower initial discharge capacity but slower capacity decay rate. The recycled NCM materials with surface treatment shows similar initial discharge capacity and also better capacity retention.

Figure 13:
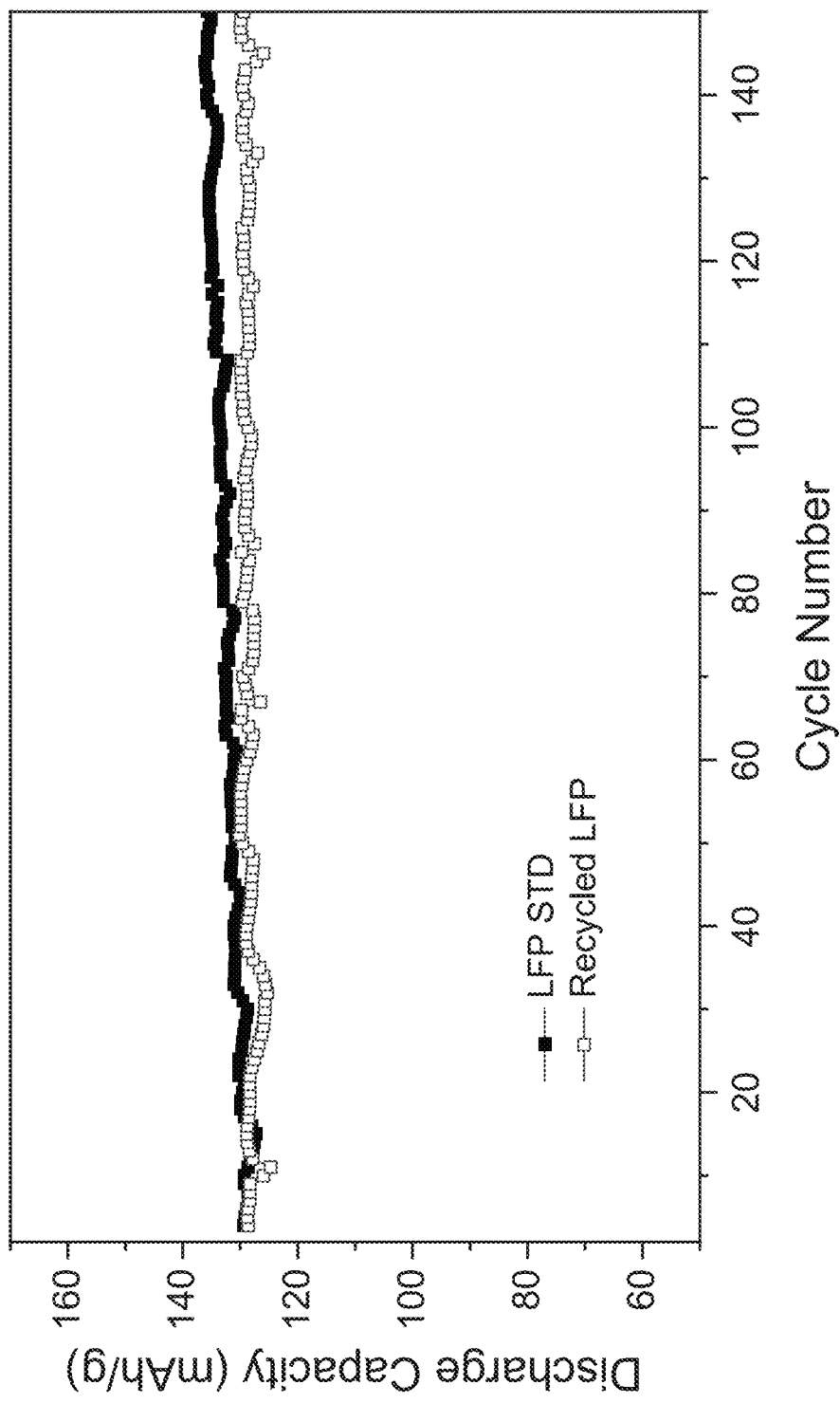
FIG. 13 shows the electrochemical performance of an electrode material lithium iron phosphate (LFP) recovered by an embodiment of the invention compared to virgin commercial electrode material (standard or STD).

Example 3: FIG. 13 shows the cycling performance of the recycled LFP materials comparing to that of the standard LFP materials. The LFP materials were recycled from the waste LFP scrap by an embodiment of the direct recycling process similar to FIG. 9. Overall, the recycled LFP materials shows very similar cycling performance comparing to the standard LFP materials.

Figure 14:
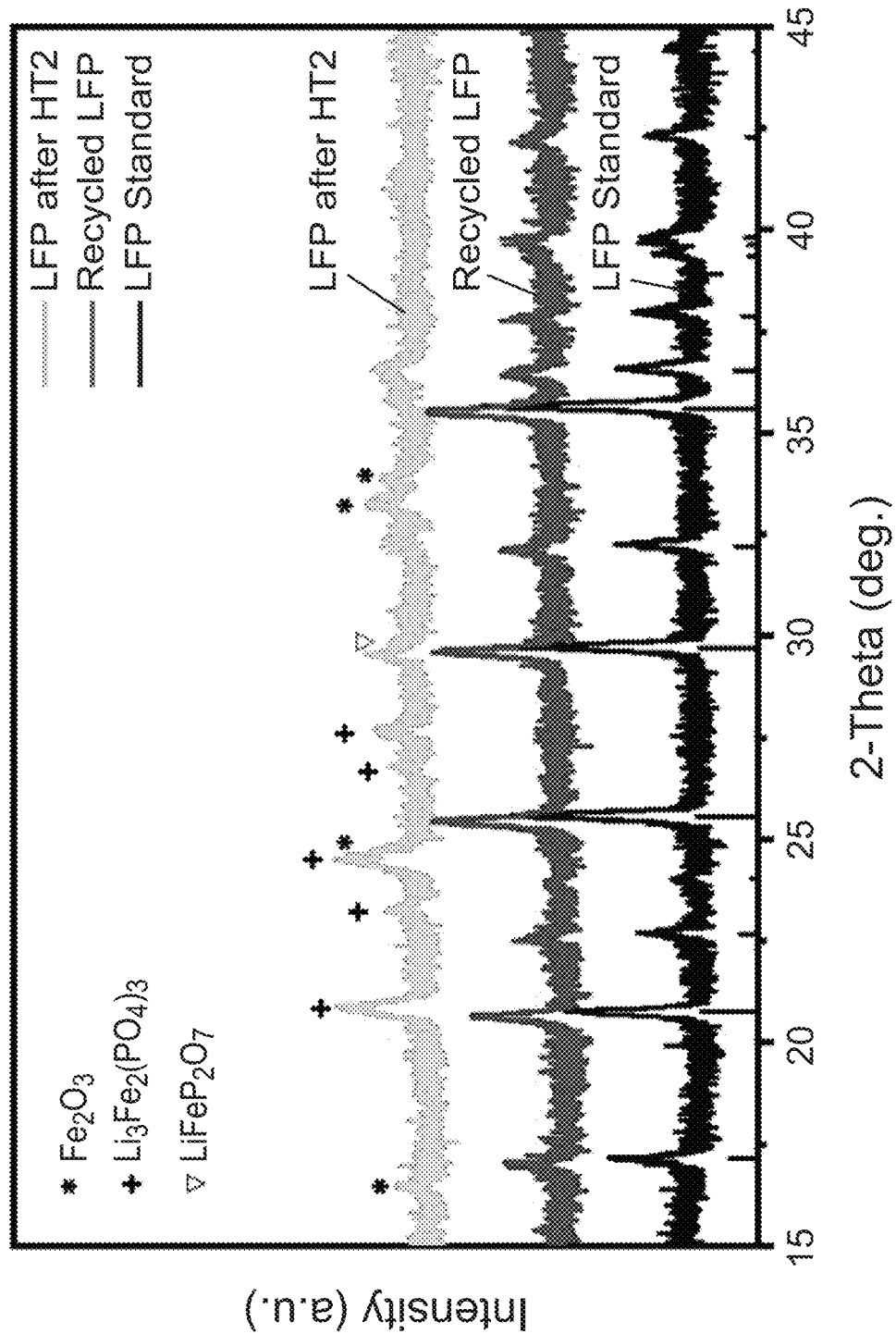
FIG. 14 shows an x-ray diffraction (XRD) pattern for a standard LFP electrode, as compared to a recycled LFP electrode and a LFP electrode after a second heat treatment.

Example 4: LFP cathode waste scrap materials were processed with a first heat treatment under an air flow of between 5 and 50 standard cubic feet per hour (SCFH). The first heat treatment was performed between 300° C. and 500° C. for 1 hour. The cathode electrode powder became delaminated from the current collector due to the decomposition of binder. The LFP electrode powder was separated from the Al current collector. The LFP powder went through a second heat treatment under an air flow between 5 and 50 SCFH. The second heat treatment was performed between 400° C. and 700° C. for 1 hour. The electrode powder turned red after the second heat treatment, suggesting the formation of oxidized cathode product. FIG. 14 shows that the XRD pattern of the electrode powder after the second heat treatment changed significantly compared to the standard LFP powder. Phases of $Li_3Fe_2(PO_4)_3$, $LiFeP_2O_7$, and $Fe_2O_3$ appeared after the second heat treatment, indicating the oxidation of the electrode materials. The carbon content in the electrode materials also decreased from to 0.03-0.1 wt % (compared to 2-3 wt % without a second heat treatment). Next, 0.62 g of glucose and 0.06 g of $LiOH·H_2O$ was mixed into 4.5 g of electrode powder collected after the second heat treatment. The mixing process was carried out with a planetary ball mill with the addition of 18 ml of water. An uniform powder mixture was collected after drying. The electrode powder then went through a third heat treatment to finish the regeneration process. The third heat treatment was performed under $N_2$ flow for 3 hours between 600° C. and 700° C.

Figure 15:
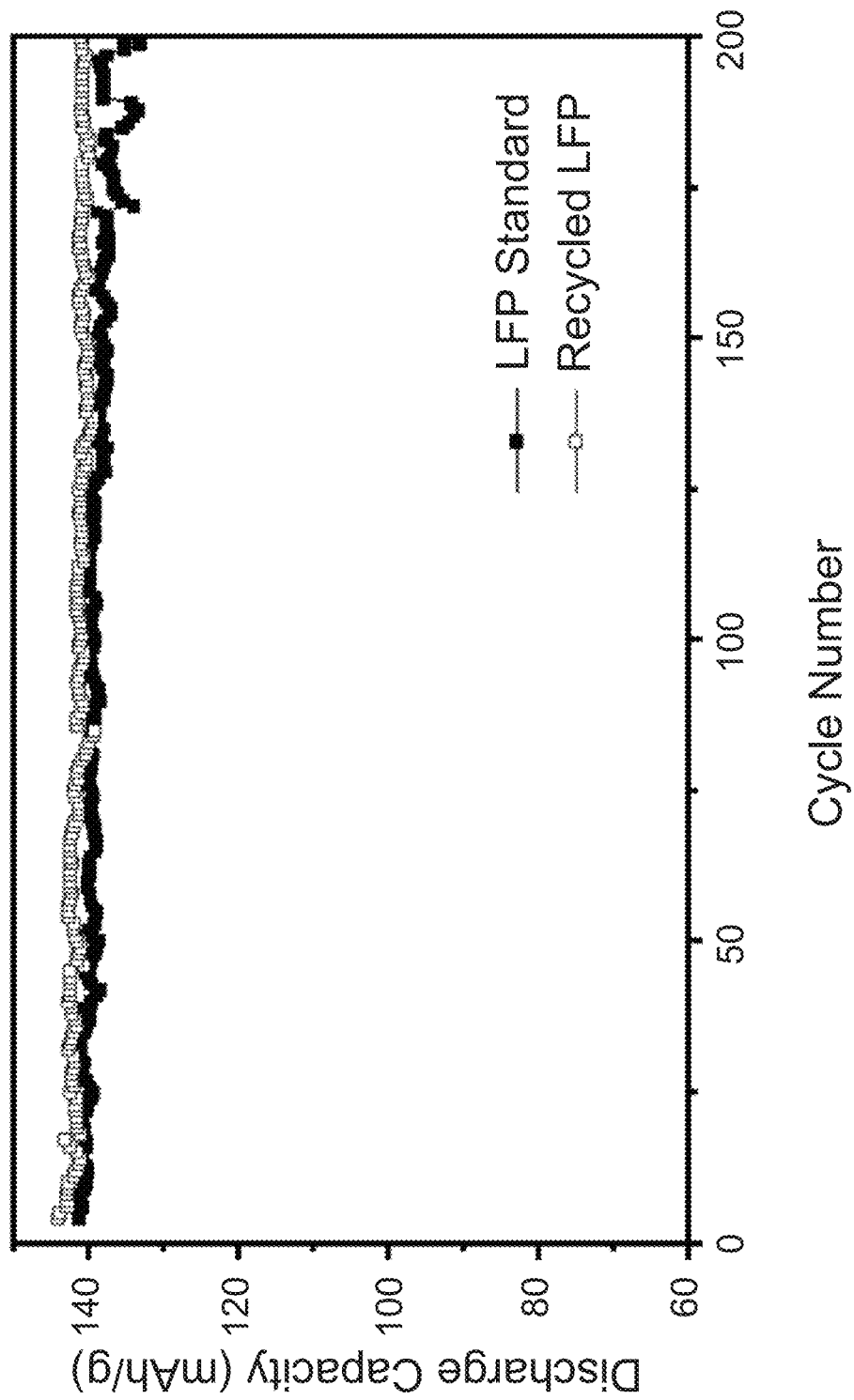
FIG. 15 shows discharge capacity of a standard LFP electrode over 200 cycles, as compared to a recycled LFP electrode.

The electrochemical performance of the recycled LFP materials were measured in CR-2032 type coin cells composed of a lithium metal counter electrode, a polypropylene separator, and an electrolyte of 1 M $LiPF_6$ in EC/DMC (3:7 by volume). The working electrodes are prepared by mixing 80 weight percent (wt %) recycled powder with 10 wt % PVDF and 10 wt % conductive carbon. The coin cells are charged and discharged at a 1C rate. FIG. 15 shows that the recycled LFP materials delivered a capacity at 1C rate comparable to standard LFP cathode materials.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of recycling a quantity of battery waste, the battery waste including an electrode material and a current collector, the electrode material including an active material and a binder, the method comprising:
   applying a first heat treatment in an inert or reducing gas environment at a temperature of between about 400° C. and about 600° C. to the battery waste, the first heat treatment decomposing at least about 80 wt % of the binder;
   separating the electrode material from the current collector; and
   applying a second heat treatment in an inert or a reducing gas environment at a temperature between about 400° C. and about 1,200° C. to the electrode material to produce a regenerated electrode material, the second heat treatment decomposing at least 90 wt % of binder remaining in the electrode material to produce a regenerated electrode material.

2. The method of claim 1, further comprising:
   applying a surface treatment to the electrode material to remove surface coatings and/or surface impurities from the electrode material.

3. The method of claim 2, wherein the surface treatment includes applying a solvent to the electrode material.

4. The method of claim 3, wherein the solvent includes at least one of citric acid, acetic acid, oxalic acid, ammonia, ammonium hydroxide, ammonium chloride, or chemical derivatives thereof.

5. The method of claim 1, wherein
   the electrode material includes at least one of $LiCoO_2$, $LiMn_2O_4$, $LiFe_tM_{1-t}PO_4$, or $LiNi_aMn_bCo_cA_dO_2$, wherein
   M includes a metal element; wherein
   $a+b+c+d=1$; wherein
   $0<t<1$; and wherein
   A=Al, Zr, or Mg.

6. The method of claim 1, wherein the first heat treatment has a duration of between about 1 hour and about 6 hours, and wherein
   the second heat treatment has a duration of between about 1 hour and about 5 hours and a temperature of between about 450° C. and about 800° C.

7. The method of claim 1, wherein the first heat treatment has a duration of between about 1 hour and about 6 hours, and wherein
the second heat treatment has a duration of between about 3 hours and about 15 hours and a temperature of between about 600° C. and about 900° C.

8. The method of claim 1, wherein the recycled electrode material has a lithium concentration of at least about 99 wt %.

9. The method of claim 1, further comprising:
washing the electrode material to remove at least a portion of the binder.

10. The method of claim 1, further comprising:
prior to the first heat treatment, removing oxidizable impurities from the electrode material via treatment with at least one of an acid having a pH of no more than about 4 or a base having a pH of at least about 13.

11. The method of claim 1, wherein the second heat treatment vaporizes all of the binder remaining in the electrode material.

12. The method of claim 1, further comprising:
after the first heat treatment, adding a lithium salt to the electrode material.

13. A method of recycling a quantity of battery waste, the battery waste including an electrode material and a current collector, the electrode material including an active material and a binder, the method comprising:
applying a first heat treatment in an inert or reducing gas environment at a temperature of between about 400° C. and about 600° C. to the battery waste, the first heat treatment decomposing at least about 80 wt % of the binder;
separating the electrode material from the current collector;
after the first heat treatment, adding a lithium salt to the electrode material; and
applying a second heat treatment in an inert or a reducing gas environment at a temperature between about 400° C. and about 1,200° C. to the electrode material to produce a regenerated electrode material.

14. The method of claim 13, further comprising:
applying a surface treatment to the electrode material to remove surface coatings and/or surface impurities from the electrode material.

15. The method of claim 14, wherein the surface treatment includes applying a solvent to the electrode material.

16. The method of claim 15, wherein the solvent includes at least one of citric acid, acetic acid, oxalic acid, ammonia, ammonium hydroxide, ammonium chloride, or chemical derivatives thereof.

17. The method of claim 13, wherein
the electrode material includes at least one of $LiCoO_2$, $LiMn_2O_4$, $LiFe_tM_{1-t}PO_4$, or $LiNi_aMn_bCo_cA_dO_2$, wherein
M includes a metal element; wherein
$a+b+c+d=1$; wherein
$0<t<1$; and wherein
A=Al, Zr, or Mg.

18. The method of claim 13, wherein the first heat treatment has a duration of between about 1 hour and about 6 hours, and wherein
the second heat treatment has a duration of between about 1 hour and about 5 hours and a temperature of between about 450° C. and about 800° C.

19. The method of claim 13, wherein the first heat treatment has a duration of between about 1 hour and about 6 hours, and wherein
the second heat treatment has a duration of between about 3 hours and about 15 hours and a temperature of between about 600° C. and about 900° C.

20. The method of claim 13, further comprising:
washing the electrode material to remove at least a portion of the binder.

21. A method of recycling a quantity of battery waste, the battery waste including an electrode material and a current collector, the electrode material including an active material and a binder, the method comprising:
applying a first heat treatment at a temperature of between about 400° C. and about 600° C. to the battery waste in an inert or reducing gas environment, the first heat treatment decomposing at least about 80 wt % of the binder;
separating the electrode material from the current collector; and
applying a second heat treatment in an inert or a reducing gas environment at a temperature between about 400° C. and about 1,200° C. to the electrode material to produce a regenerated electrode material, the second heat treatment decomposing at least 90 wt % of binder remaining in the electrode material to produce a regenerated electrode material.

22. The method of claim 21, further comprising:
applying a surface treatment to the electrode material to remove surface coatings and/or surface impurities from the electrode material.

23. The method of claim 22, wherein the surface treatment includes applying a solvent to the electrode material.

24. The method of claim 21, wherein
the electrode material includes at least one of $LiCoO_2$, $LiMn_2O_4$, $LiFe_tM_{1-t}PO_4$, or $LiNi_aMn_bCo_cA_dO_2$, wherein
M includes a metal element; wherein
$a+b+c+d=1$; wherein
$0<t<1$; and wherein
A=Al, Zr, or Mg.

25. The method of claim 21, further comprising:
washing the electrode material to remove at least a portion of the binder.

26. The method of claim 21, wherein the recycled electrode material has a lithium concentration of at least about 99 wt %.

27. The method of claim 22, further comprising:
prior to the first heat treatment, removing oxidizable impurities from the electrode material via treatment with at least one of an acid having a pH of no more than about 4 or a base having a pH of at least about 13.

* * * * *